US012067828B2

(12) United States Patent
Shaffer, Jr. et al.

(10) Patent No.: US 12,067,828 B2
(45) Date of Patent: Aug. 20, 2024

(54) FLOOR PROJECTION SYSTEM FOR ELECTRONIC GAMING DEVICES

(71) Applicant: Aristocrat Technologies, Inc., Las Vegas, NV (US)

(72) Inventors: Stephen Shaffer, Jr., Las Vegas, NV (US); Frank Rodriguez, Las Vegas, NV (US); Alexander Coulthard, Las Vegas, NV (US)

(73) Assignee: ARISTOCRAT TECHNOLOGIES INC. (ATI), Las Vegas, NV (US)

( * ) Notice: Subject to any disclaimer, the term of this patent is extended or adjusted under 35 U.S.C. 154(b) by 110 days.

(21) Appl. No.: 17/449,402

(22) Filed: Sep. 29, 2021

(65) Prior Publication Data

US 2022/0270435 A1 Aug. 25, 2022

Related U.S. Application Data

(60) Provisional application No. 63/153,145, filed on Feb. 24, 2021.

(51) Int. Cl.
*G07F 17/32* (2006.01)
*G07F 17/34* (2006.01)

(52) U.S. Cl.
CPC .......... *G07F 17/3211* (2013.01); *G07F 17/34* (2013.01)

(58) Field of Classification Search
CPC ............. G07F 17/3211; G07F 17/3216; G07F 17/3225; G07F 17/3227; G07F 17/323; G07F 17/34
See application file for complete search history.

(56) References Cited

U.S. PATENT DOCUMENTS

| | | | | |
|---|---|---|---|---|
| 8,002,619 B2 * | 8/2011 | Gagner | G07F 17/3267 | 463/13 |
| 8,100,750 B2 * | 1/2012 | Luciano, Jr. | G06F 3/0425 | 463/31 |
| 8,235,795 B2 * | 8/2012 | Green | G07F 17/3213 | 463/20 |

(Continued)

FOREIGN PATENT DOCUMENTS

| | | | | |
|---|---|---|---|---|
| DE | 102011107254 A1 | 1/2013 | | |
| JP | 2004216160 A * | 8/2004 | G07F 17/32 | |
| JP | 6526088 B2 * | 6/2019 | | |

OTHER PUBLICATIONS

Translation of DE 102011107254 (in previously submitted IDS) (Year: 2013).*

*Primary Examiner* — Milap Shah
(74) *Attorney, Agent, or Firm* — McAndrews, Held & Malloy, Ltd.

(57) ABSTRACT

Gaming devices and systems incorporating one or more image projectors capable of displaying under control of a video controller. The video controller may be onboard the gaming device, or can be a video controller server in networked communication with an individual gaming device; wherein some cases both such video controllers may be utilized. The video controller(s) have access to one or more image projectors on a gaming device and may respond to different trigger conditions to exercise control over image projectors of respective gaming devices. An onboard video controller in a first gaming device may communicate with two or more additional gaming devices, such as a bank of gaming devices, for controlling image projectors of such devices.

17 Claims, 21 Drawing Sheets

(56) References Cited

U.S. PATENT DOCUMENTS

| | | | | |
|---|---|---|---|---|
| 8,246,456 | B2 * | 8/2012 | Motyl | G06F 3/0421 463/31 |
| 10,237,511 | B2 | 3/2019 | Garing | |
| 10,345,686 | B2 | 7/2019 | Muramatsu | |
| 11,544,989 | B1 * | 1/2023 | Seelig | G07F 17/3211 |
| 2003/0220139 | A1 * | 11/2003 | Peterson | G07F 17/3211 463/30 |
| 2004/0214630 | A1 * | 10/2004 | Mayeroff | G07F 17/34 463/20 |
| 2005/0277467 | A1 * | 12/2005 | Karabin | G07F 17/3244 463/31 |
| 2010/0279757 | A1 * | 11/2010 | Glenn, II | G07F 17/3211 463/30 |
| 2011/0223993 | A1 * | 9/2011 | Allen | G07F 17/32 463/30 |
| 2011/0263326 | A1 | 10/2011 | Gagner | |
| 2011/0269543 | A1 * | 11/2011 | Johnson | G07F 17/3209 463/37 |
| 2012/0129601 | A1 * | 5/2012 | Gronkowski | G07F 17/3239 463/31 |
| 2015/0294606 | A1 | 10/2015 | Bazos | |
| 2016/0349929 | A1 * | 12/2016 | Clemons | A63F 13/54 |
| 2021/0027574 | A1 * | 1/2021 | Rodriguez | G07F 17/3216 |
| 2021/0350657 | A1 * | 11/2021 | Clear | G07F 17/3223 |

* cited by examiner

FLOOR PROJECTION SYSTEM FOR ELECTRONIC GAMING DEVICES

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game.

An EGM may include one or more displays. The displays may present user interface elements that enable a user to play a wagering game during. The UI element may be updated as the wagering game progresses. For example, "Slot" type games are often displayed to the player in the form of various symbols arrayed in a row-by-column grid or matrix. Specific matching combinations of symbols along predetermined paths (or paylines) through the matrix indicate the outcome of the game. The displays typically highlights winning combinations/outcomes for identification by the player.

When an EGM is not being played, the displays may be placed in a demonstration mode (e.g., an attract mode) that illustrates how the EGM may be played. In other examples, the displays may include a current total of progressive jackpots that may be won by a player should they win. For example, there may be a topper display that rotates through the current values of the progressive prizes.

SUMMARY OF THE INVENTION

In selected implementations, a new construction of gaming devices incorporating one or more image projectors capable of displaying multiple images under control of a video controller. Control of the projectors can present different considerations depending in part on the systems that will establish inputs that will serve to trigger controls of the image projector(s). An additional consideration relates to how data representative of images to be displayed can be efficiently stored and/or transmitted to allow the gaming device/system to function efficiently. In selected examples, the video controller may be onboard the gaming device, or alternatively can be a video controller server in networked communication with an individual gaming device. In some examples both onboard and external video controllers may have access to one or more image projectors on a gaming device, such onboard and external video controllers may respond to different trigger conditions to exercise control over image projectors of respective gaming devices. In some implementations an onboard video controller in a first gaming device may communicate with two or more additional gaming devices, such as a bank of gaming devices, for controlling image projectors of such devices.

Additional implementations of the invention include a first example implementation providing a gaming device, including a display system comprising a main display and a projector display, in which the projector display is arranged to project an image in a display area on a surface proximate the gaming device; and a control system comprising one or more processors. The control system includes a video controller, the control system executing instructions which cause the control system to: conduct a game on the gaming device, including presenting information regarding the game on the main display; control the display system to present the projector display in a default state; control the display system to present content from a base game on the main display; receive a trigger condition; determine that the trigger condition is associated with a changed state for the projector display; and based on the determination, update the projector display to a new state while maintaining presentation of the game on the main display.

An additional example provides a gaming system including a first gaming device, the first gaming device having at least a first image projector arranged to project images on a surface adjacent the first gaming device; and a second gaming device, the second gaming device having at least a second projector are arranged to project images on a surface adjacent the second gaming device. The gaming system further includes one or more external controllers in networked communication with the first and second gaming devices, wherein the one or more external controllers an external video controller, wherein the video controller is a multi-port video controller in communication with both the first gaming device and the second gaming device. The one or more external controllers execute instructions to perform operations including: through use of an external video controller in communication with both a first gaming device and a second gaming device: controlling the first image projector on the first gaming device to display a first image on the surface adjacent the first gaming device, wherein data for displaying the first image is stored in memory accessible to the external video controller; and controlling the second image projector on the second gaming device to display a second image on the surface adjacent the second gaming device, wherein the data for displaying the second image is stored in memory accessible to the external video controller.

A further example provides a method of operating a gaming device comprising a display system including a main display and an image projector, wherein the image projector is arranged to project an image in a display area on a surface proximate the gaming device, and wherein the gaming device includes at least one sensor identifying a condition proximate the gaming device; the method comprising: operating a control system comprising one or more processors and providing onboard video controller functionality. In this example, the control system is operable to: conduct a game on the gaming device in response to a player input, wherein conducting the game includes presenting information regarding the game on the main display; through use of the at least one sensor, identifying a current condition proximate the gaming device which acts as a trigger condition; and communicating the trigger condition determined through the at least one sensor to a video controller which controls the image projector to display an image on a surface proximate the gaming device.

BRIEF DESCRIPTION OF THE SEVERAL VIEWS OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

DETAILED DESCRIPTION

Figure 1:
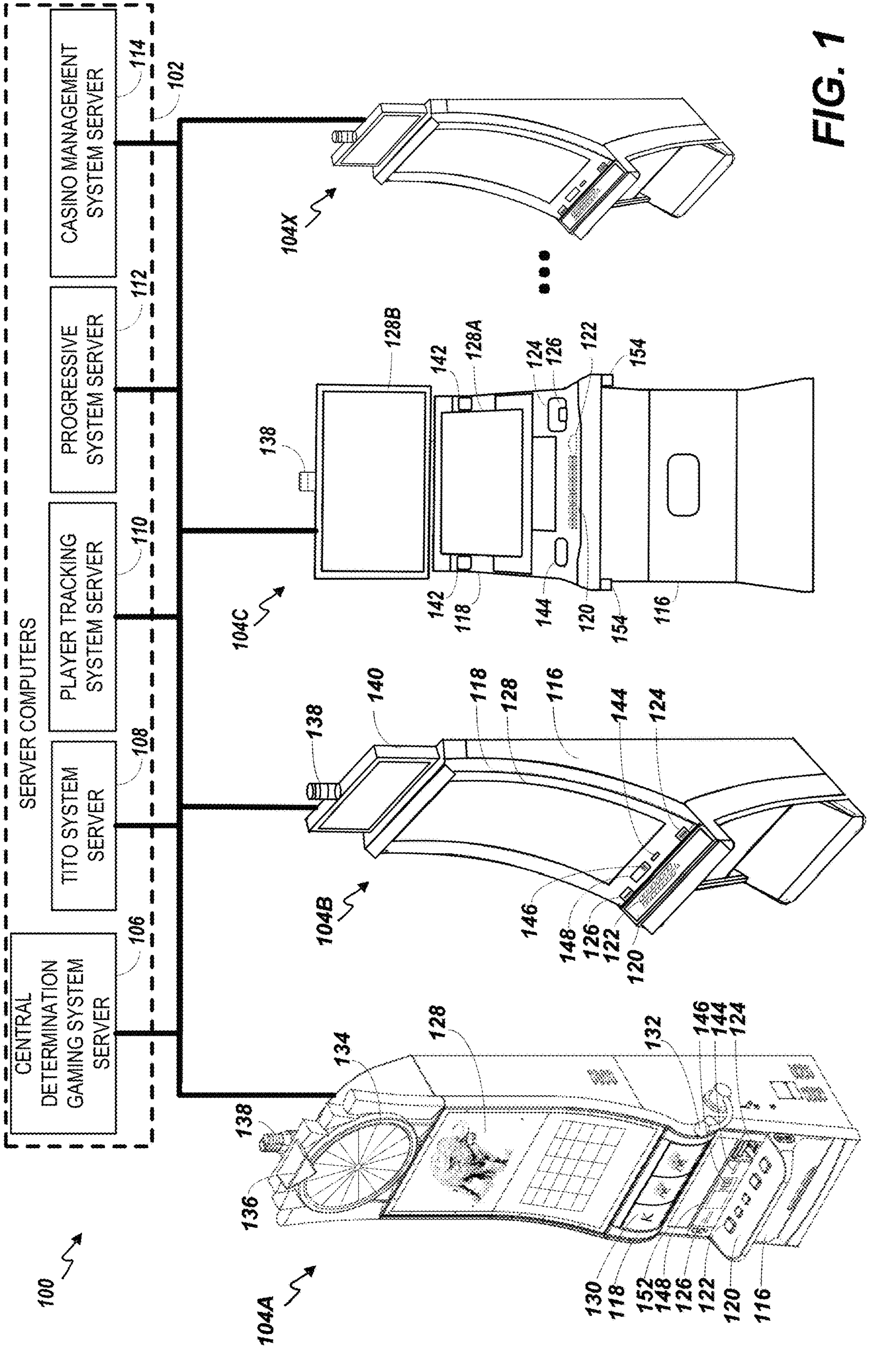
FIG. 1 is a diagram showing several EGMs networked with various gaming-related servers, according to various examples.

Displays on an EGM generally are generally configured to operate in one of two modes: (1) game play mode; and (2) attract mode. When in the game mode, the displays will present information to the game player associated with the wagering game currently being played by the game player. When in attract mode, the displays will present information or graphics in an attempt to attract a new player to sit down or otherwise play the EGM. An EGM may transition a display from the attract mode to the game play when a player inserts a physical item having monetary value into a credit input mechanism or device of the EGM.

Despite the presence of multiple displays, there are still limitations with current display configurations. For example, although there may be displays on the EGM and perhaps even on the back of a chair of the EGM, there are no graphics that are displayed on the base surface (e.g., the floor or part of an installation surface) surrounding an EGM. In various examples, dynamic projection display systems (e.g., projectors capable of video output) are used to present the information on the base surfaces. There may be multiple projectors on a single EGM. Locations of the projectors may include, but are not limited to, underneath a button deck, underneath an armrest of a connected chair, and on the backside of a connected chair. Due to projector placement, the images and/or video presented by the projectors may not be visible to a player of the EGM in some examples. In various examples, instead of, or in addition to projectors, LED panel floors, LCDs, and OLEDs may be used as displays surrounding a gaming machine.

Displaying information on the base surface permits user experiences (UX) and EGM enhancements not previously possible with existing EGM configurations. Example UX and EGM enhancements include, but are not limited to, enhancing the attract mode of EGMS; presenting brand information in areas previously not possible with existing displays; displaying the type of a game near a player as they are walking; advertising the graphics of the game near a player; casino branding, information, and advertising; displaying bonus alerts to signal other nearby players of the status of game; and using the projector as an alternative to or additional to a candle indicator.

Consequently, using projectors (e.g., pico laser projectors) to display dynamic content on the ground, improvements are made to gaming machines themselves as well as enhancing user interfaces. These improvements are made without taking over or changing existing displays. For example, if an existing display of an EGM may be repurposed to display some of the information describe above, doing so would decrease the amount of information available to a player—thereby providing an inferior user interface.

A problem in implementing such a projector in an gaming device/system is how to configure the system for efficiency in terms of storage or transmission of data image information for display by the projectors, which may be impacted by sources of information which will be used to change operational modes of the projectors, which then impacts whether local or networked video control and/or storage of the image data is preferable. Additionally, the description addresses the onboard and/or external video controllers which may be used in example systems, to address the above concerns in a manner to efficiently change operational modes of projectors and/or content within an operational mode (as discussed further relative to FIG. 5). Further details concerning the use of projectors on an EGM are discussed below.

FIG. 1 illustrates several different models of EGMs which may be networked to various gaming-related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (Wi-Fi®) and Bluetooth®), cable TV, satellite links and the like.

In some implementation, server computers 102 may not be necessary and/or preferred. For example, in one or more implementations, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The mechanical reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution liquid crystal display (LCD), plasma, light emitting diode (LED), or organic light emitting diode (OLED) panel which may be flat or curved as shown, a cathode ray tube, or other conventional electronically controlled video monitor.

In some implementations, the bill validator 124 may also function as a "ticket-in" reader that allows the player to use a casino issued credit ticket to load credits onto the gaming device 104A (e.g., in a cashless ticket ("TITO") system). In such cashless implementations, the gaming device 104A may also include a "ticket-out" printer 126 for outputting a credit ticket when a "cash out" button is pressed. Cashless TITO systems are used to generate and track unique barcodes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some implementations, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game-related graphics. In some implementations, the information panel(s) 152 may be implemented as an additional video display.

Gaming devices 104A have traditionally also included a handle 132 typically mounted to the side of main cabinet 116 which may be used to initiate game play.

Figure 2A:
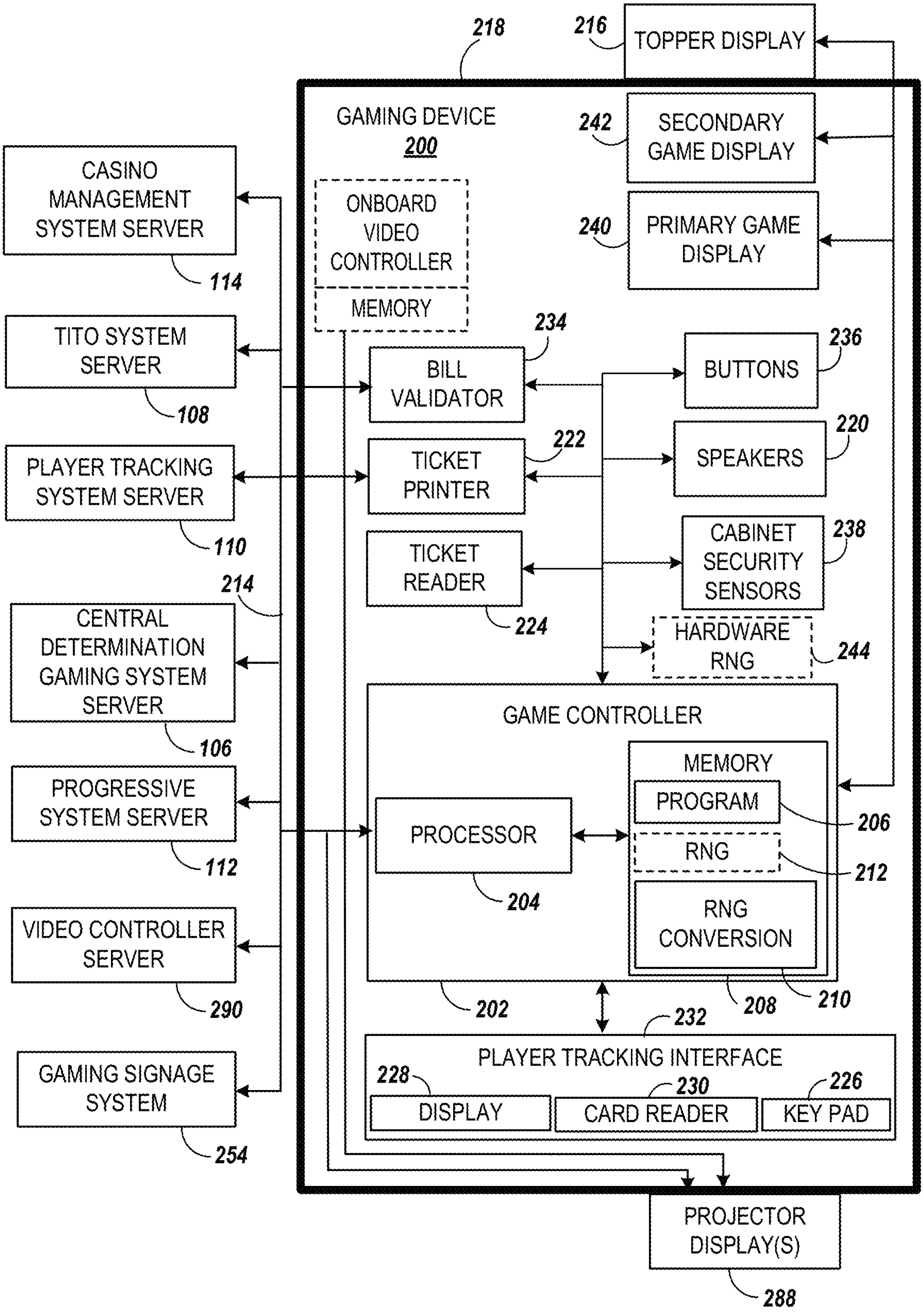
FIG. 2A is a block diagram showing various functional elements of an EGM, according to various examples.

Many or all the above described components can be controlled by circuitry (e.g., a game controller) housed inside the main cabinet 116 of the gaming device 104A, the details of which are shown in FIG. 2A.

An alternative example gaming device 104B illustrated in FIG. 1 is the Arc' model gaming device manufactured by Aristocrat® Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some implementations, the optional topper screen 140 may also or alternatively be used to display progressive jackpot prizes (e.g., mini, minor, major, and grand) available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the main display 128A may have a curvature radius from top to bottom, or alternatively from side to side. In some implementations, main display 128A is a flat panel display. Main display 128A is typically used for primary game play while secondary display 128B is typically used for bonus game play, to show game features or attraction activities while the game is not in play or any other information or media desired by the game designer or operator. In some implementations, example gaming device 104C may also include speakers 142 to output various audio such as game sound, background music, etc. Gaming device 104C is also illustrated as including two image projectors 154. Example functions of these image projectors are discussed in more detail in reference to FIGS. 4-19. The terms “image projectors” and “projector displays” are used interchangeably in the present description.

Many different types of games, including mechanical slot games, video slot games, video poker, video blackjack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2A is a block diagram depicting exemplary internal electronic components of a gaming device 200 connected to various external systems. All or parts of the gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player’s credit value, a ticket reader 224 which reads bar-coded tickets or other media or mechanisms for storing or indicating a player’s credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smartphone enabling player tracking. FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, a secondary game display 242, and one or more projector displays 288, each coupled to and operable under the control of game controller 202. In some examples, the one or more projector displays may be controlled by an onboard video controller 292 which may have either an internal or associated memory 294, storing one or more image files which may be projected as images by the projector displays.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include a RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

In FIG. 2A, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features. In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes a RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

The lookup tables, in the form of weighted tables, can have one of many possible configurations. In general, a weighted table can be implemented as any data structure that assigns probabilities to different options, in order for one of the different options to be selected using a random number. Different options are represented in different entries of a weighted table. For example, there may be multiple possible values within each tier of the weighted table, and the multiple possible values may be unequally weighted. The probabilities for different options can be reflected in threshold values (e.g., 1<RND<=40 for option 1, 40<RND<=70 for option 2, 70<RND<=90 for option 3, and 90<RND<=100 for option 4, given four options and a random number RND where 0<RND<=100). The threshold values can represent percentages or, more generally, subranges within the range for a random number. In some example implementations, the threshold values for a weighted table are represented as count values for the respective entries of the weighted table. For example, the following table shows count values for the four options described above:

TABLE 1

EXAMPLE WEIGHTED TABLE

| count value | entry |
|---|---|
| 40 | <value a1, value a2, . . . > |
| 30 | <value b1, value b2, . . . > |
| 20 | <value c1, value c2, . . . > |
| 10 | <value d1, value d2, . . . > |

The sum total of the count values indicates the range of the options. Control logic can use a random number, generated between 1 and the sum total of the count values, to select one of the entries in the weighted table by comparing the random number to successive running totals. In the example shown in Table 1, if the random number is 40 or less, the first entry is selected. Otherwise, if the random number is between 41 and 70, the second entry is selected. Otherwise, if the random number is between 71 and 90, the third entry is selected. Otherwise, the last entry is selected.

The threshold values for a weighted table can be fixed and pre-determined. Or, the threshold values for a weighted table can vary dynamically (e.g., depending on bet level). Or, a weighted table can be dynamically selected (e.g., depending on bet level) from among multiple available weighted tables. Different parameters or choices during game play can use different weighted tables. Or, different combinations of parameters or choices can be combined in entries of a given weighted table.

FIG. 2A also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g., amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., Wi-Fi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

In some examples, the onboard video controller 292 may control the one or more projector displays 288 either directly, or in combination with game controller 202. In some examples, onboard video controller 292 may be coupled to receive inputs from game controller 202 as will be described in more detail relative to FIGS. 4 and 5. Onboard video controller 292 may include processor functionality for determining trigger conditions and controlling display of images (static and/or video (optionally, in the form of animations)).

In other examples, all or at least a portion of video controller functionality may be handled by an external video controller 290 coupled over a network to multiple individual gaming devices 200. As will be described in more detail later herein, and through reference to FIG. 11, in some examples, external video controller 290 may be a multi-port video controller with memory storing images (static and/or video), and may remotely control display of images by projector displays 288 of individual gaming machines, and in some examples may control the projector displays to display respective portions of a composite static or video image.

Although FIGS. 1 and 2A illustrate specific implementations of a gaming device (e.g., gaming devices 104A-104X and 200), the disclosure is not limited to those implementations shown in FIGS. 1 and 2. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 2B:
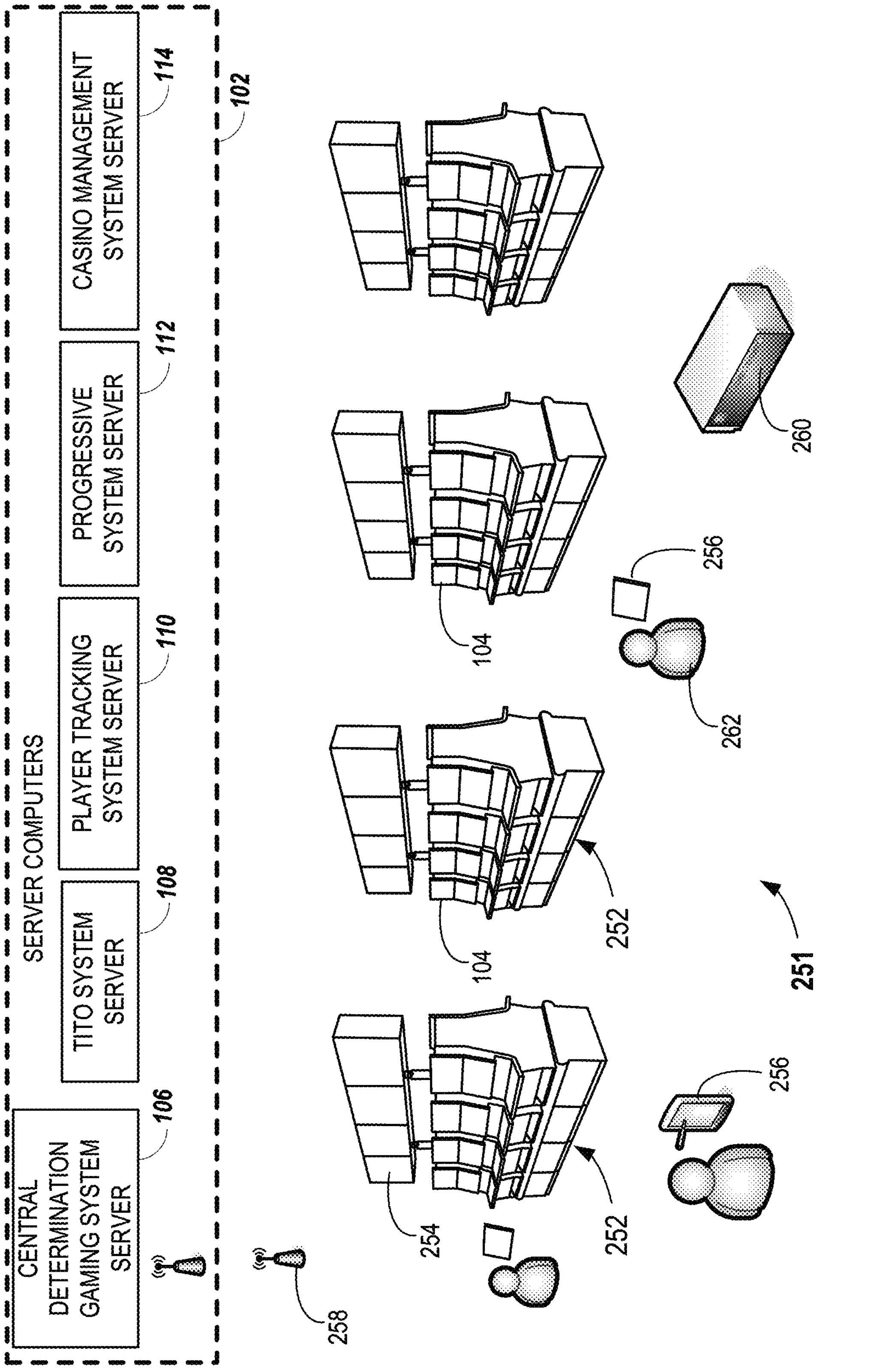
FIG. 2B depicts a casino gaming environment, according to various examples.

FIG. 2B depicts a casino gaming environment according to one example. In this example, the casino 251 includes banks 252 of EGMs 104. In this example, each bank 252 of EGMs 104 includes a corresponding gaming signage system 254 (also shown in FIG. 2A). According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258. In some examples, wireless access points 258 can communicate with mobile gaming devices 256 (whether or not being currently used for gaming, for example, cellular phones), and may be in the form of Bluetooth beacons, such as Bluetooth Low Energy (BLE) beacons, or in some instances through Near-Field Communication (NFC) protocols. In the case of wireless access points 258 implementing NFC communications, such access points may be located on individual gaming devices. Use of such BLE or NFC communications will typically be subject to regulatory controls and/or player consent.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash-in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the casino patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor (s) to verify the identity of an authorized patron. Some mobile gaming devices 256 may be configured to function only within a predetermined or configurable area, such as a casino gaming area.

Figure 2C:
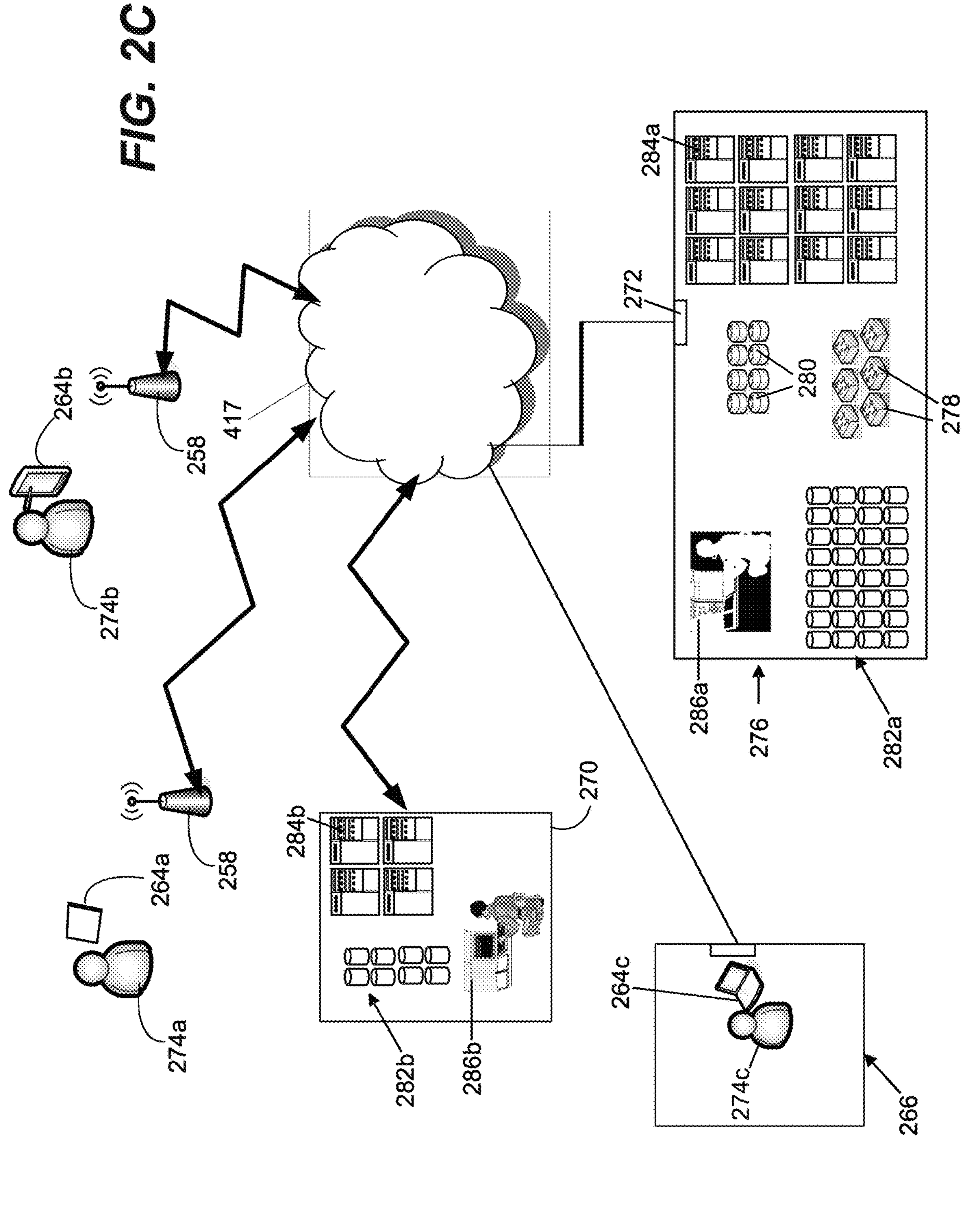
FIG. 2C is a diagram that shows examples of components of a system for providing online gaming according to some aspects of the present disclosure, according to various examples.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end user devices (EUDs) 264*a*, 264*b* and 264*c* are capable of communication via one or more networks 417. The networks 417 may, for example, include one or more cellular telephone networks, the Internet, etc. In this example, the EUDs 264*a* and 264*b* are mobile devices: according to this example the EUD 264*a* is a tablet device and the EUD 264*b* is a smart phone. In this implementation, the EUD 264*c* is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 is capable of communication with the networks 417 via the gateway 272. In this example, switches 278 and routers 280 are configured to provide network connectivity for devices of the gaming data center 276, including storage devices 282*a*, servers 284*a* and one or more workstations 570*a*. The servers 284*a* may, for example, be configured to provide access to a library of games for online game play. In some examples, code for executing at least some of the games may initially be stored on one or more of the storage devices 282*a*. The code may be subsequently loaded onto a server 284*a* after selection by a player via an EUD and communication of that selection from the EUD via the networks 417. The server 284*a* onto which code for the selected game has been loaded may provide the game according to selections made by a player and indicated via the player's EUD. In other examples, code for executing at least some of the games may initially be stored on one or more of the servers 284*a*. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284*b*, storage devices 282*b*, and one or more workstations 286*b*. According to this example, the financial institution data center 270 is configured to maintain financial accounts, such as checking accounts, savings accounts, loan accounts, etc. In some implementations one or more of the authorized users 274*a*-274*c* may maintain at least one financial account with the financial institution that is serviced via the financial institution data center 270.

According to some implementations, the gaming data center 276 may be configured to provide online wagering games in which money may be won or lost. According to some such implementations, one or more of the servers 284*a* may be configured to monitor player credit balances, which may be expressed in game credits, in currency units, or in any other appropriate manner. In some implementations, the server(s) 284*a* may be configured to obtain financial credits from and/or provide financial credits to one or more financial institutions, according to a player's "cash-in" selections, wagering game results and a player's "cash out" instructions. According to some such implementations, the server (s) 284*a* may be configured to electronically credit or debit the account of a player that is maintained by a financial institution, e.g., an account that is maintained via the financial institution data center 270. The server(s) 284*a* may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274*a*-274*c*), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 3:
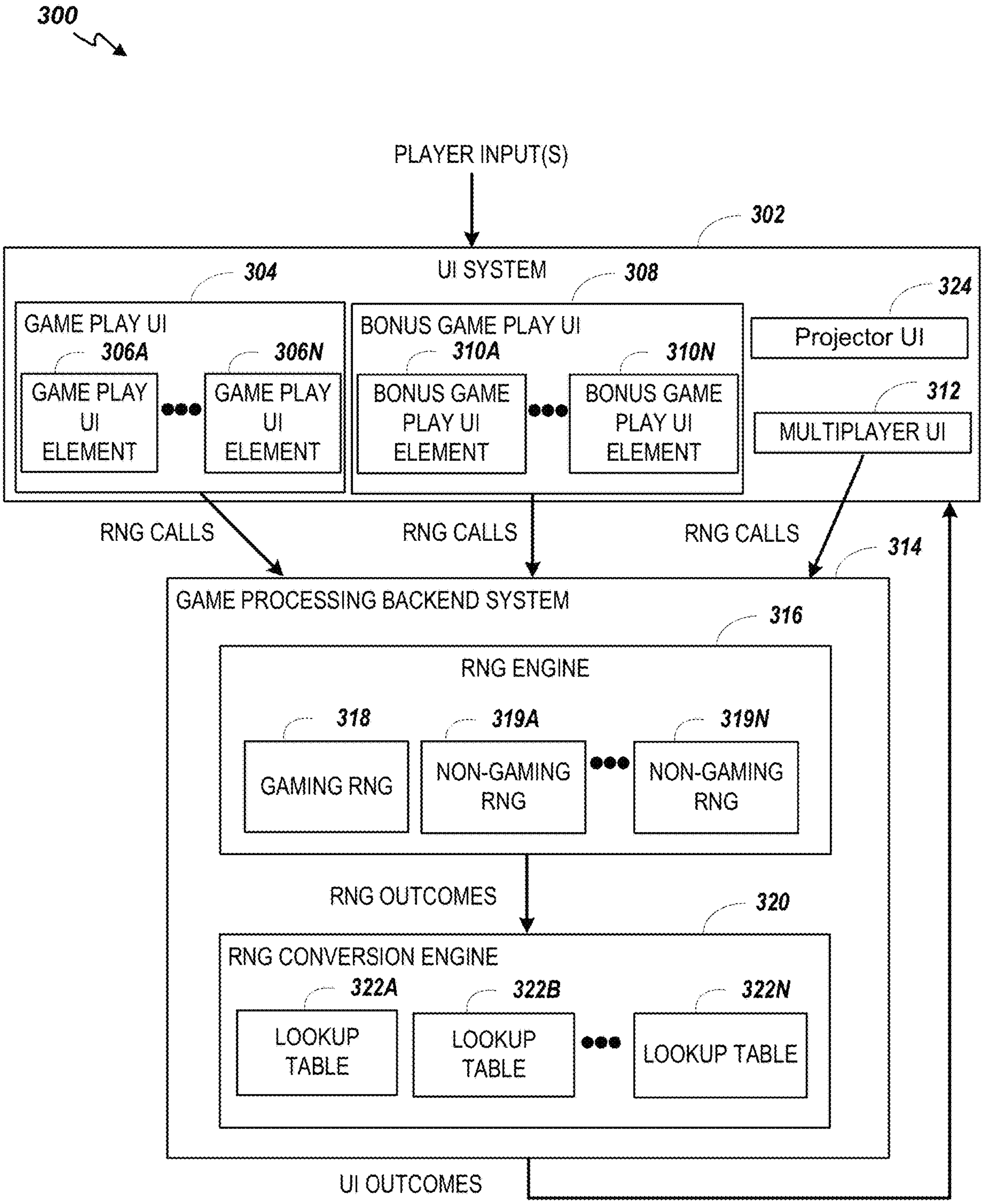
FIG. 3 illustrates, in block diagram form, an implementation of a game processing architecture algorithm that implements a game processing pipeline for the play of a game in accordance with various implementations described herein, according to various examples.

FIG. 3 illustrates, in block diagram form, an implementation of a game processing architecture 300 that implements a game processing pipeline for the play of a game in accordance with various implementations described herein. As shown in FIG. 3, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming device, such as gaming devices 104A-104X and 200 shown in FIGS. 1 and 2, respectively. Alternatively, portions of the gaming processing architecture 300 can implement the game processing pipeline using a gaming device and one or more remote gaming devices, such as central determination gaming system server 106 shown in FIG. 1.

The UI system 302 includes one or more UIs that a player can interact with. The UI system 302 could include one or more game play UIs 304, one or more bonus game play UIs 308, and one or more multiplayer UIs 312, where each UI type includes one or more mechanical UIs and/or graphical UIs (GUIs). In other words, game play UI 304, bonus game play UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (e.g., GUI elements depicting one or more virtual reels) are shown and/or made available to a user. In a subsequent game instance, the UI system 302 could transition out of the base game to one or more bonus games. The bonus game play UI 308 represents a UI that utilizes bonus game play UI elements 310A-310N for a player to interact with and/or view during a bonus game. In one or more implementations, at least some of the game play UI element 306A-306N are similar to the bonus game play UI elements 310A-310N. In other implementations, the game play UI element 306A-306N can differ from the bonus game play UI elements 310A-310N.

FIG. 3 also illustrates that UI system 302 could include a multiplayer UI 312 purposed for game play that differs or is separate from the typical base game. For example, multiplayer UI 312 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 could corresponds to RNG 212 or hardware RNG 244 shown in FIG. 2A. As previously discussed with reference to FIG. 2A, gaming RNG 318 often performs specialized and non-generic operations that comply with regulatory and/or game requirements. For example, because of regulation requirements, gaming RNG 318 could correspond to RNG 212 by being a cryptographic RNG or pseudorandom number generator (PRNG) (e.g., Fortuna PRNG) that securely produces random numbers for one or more game features. To securely generate random numbers, gaming RNG 318 could collect random data from various sources of entropy, such as from an operating system (OS) and/or a hardware RNG (e.g., hardware RNG 244 shown in FIG. 2A). Alternatively, non-gaming RNGs 319A-319N may not be cryptographically secure and/or be computationally less expensive. Non-gaming RNGs 319A-319N can, thus, be used to generate outcomes for non-gaming purposes. As an example, non-gaming RNGs 319A-319N can generate random numbers for generating random messages that appear on the gaming device.

The RNG conversion engine 320 processes each RNG outcome from RNG engine 316 and converts the RNG outcome to a UI outcome that is feedback to the UI system 302. With reference to FIG. 2A, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N to regulate a prize payout amount for each RNG outcome and how often the gaming device pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome and the game outcome controls the frequency in hitting certain prize payout amounts. Different lookup tables could be utilized depending on the different game modes, for example, a base game versus a bonus game.

Figure 4:
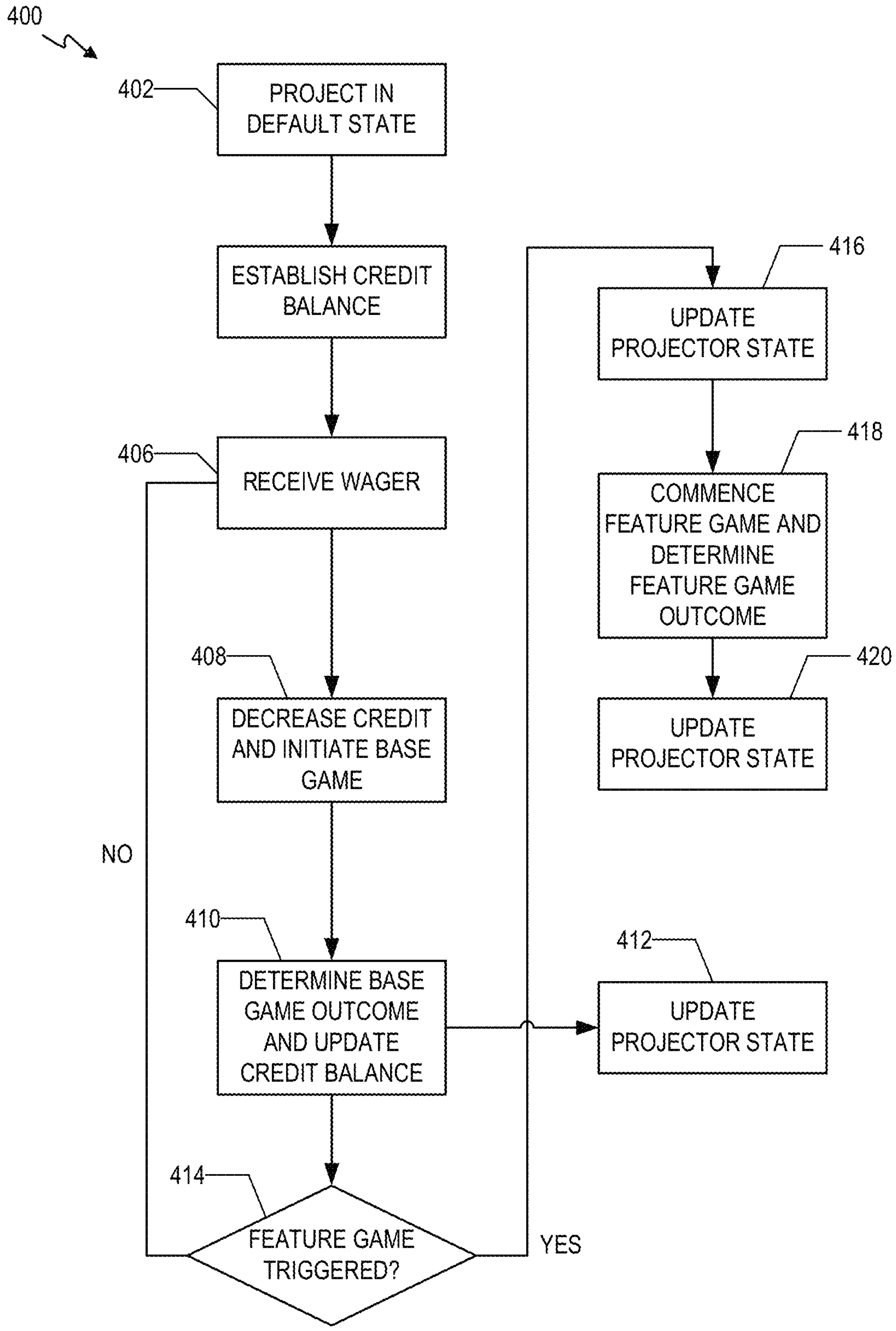
FIG. 4 is a flowchart 400 illustrating a set of operations of a process to update a projector display during gameplay, according to various examples.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game, the UI system could update one or more bonus game play UI elements 310A-310N (e.g., symbols) for the bonus game play UI 308. In response to updating the appropriate UI, the player may subsequently provide additional player inputs to initiate a subsequent game instance that progresses through the game processing pipeline FIG. 4 is a flowchart 400 illustrating a set of operations of a process to update a projector display during gameplay. The process may be implemented using gaming device 200 in various examples. Flowchart 400 indicates three instances in which the projector display is updated, but there may be fewer or more updates without departing from the scope of this disclosure. Furthermore, the updates to the projector display may be performed using UI system 302, game controller 202, or casino management system server 114 in various examples.

The process may begin even before a player initiates a game on a gaming device. At operation 402, the projector display (or displays) of the gaming device may be in a default state when a player is not using the gaming device. The default state may be an attract mode whereby information about progressive jackpots, etc., is displayed in the display areas on the floor by the gaming machine in an attempt to have a player initiate gameplay. In other examples, the default state may be a casino information mode or advertisements related thereto. In some instances, the default state may include rotating though the attract mode and casino information mode. The projector display(s) may be at least partially under control of a projector UI 324 in the gaming machine, or under control of an onboard video controller 292 of FIG. 2A; or may be partially under control of a server, such as servers 110, 112, 114 and/or 290 of FIG. 2A. Entry into the default state (either off, or with selected content) may be in response to a triggering event, such as a lapse of a selected time interval from the last game play; which in some examples may be paired with a second condition, such as a sensor signal that the gaming chair is not occupied, or the absence of detected motion or proximity from a sensor at the gaming machine. Such a motion or proximity sensor may be incorporated into the projector display assembly 288 of FIG. 2A.

The process can continue (or in other examples, begin) when a player initiates play of a base game on gaming device 200. As gaming device conducts a game, various events in the gameplay, or external to the gaming device 200, may trigger changing individual images displayed and/or a projector mode of operation and gaming device 200.

At operation 404, gaming device 200 may establish a credit balance for the player. The credit balance may be displayed on player tracking display 228 in various examples. To this end, a player may insert a physical item having monetary value into a credit input mechanism or device, such as the ticket reader 224 or bill validator 234, of the gaming device 200. In response to the received physical item, the gaming device 200 may increase a credit value of a credit meter displayed to a player based on the monetary value of the physical item.

At operation 406, the gaming device 200 may receive a wager. A player may use the player input buttons 236 to specify a value of an amount to be wagered with the wager being funded by the credit value of the credit meter. The gaming device 200 may display a message such as "Press SPIN to play" in a message box, e.g., on the primary game display 240. When the player presses a SPIN button, e.g., in the player-input buttons 236, the gaming device 200, at operation 408 may decrease the player's credit balance by the specified wager and initiate play of a spinning reel game (e.g., the base game) by spinning one or more reels. In various examples, the projector display may present one or more symbols from base game during a spin.

Next, at operation 410, the gaming device 200 may determine the base game outcome and update a credit balance of the player. For example, gaming device 200 may stop the reels based on one or more random values generated by RNG 212 to obtain the base game outcome comprising a matrix, or any other formation or arrangement, of symbols. In other embodiments, gaming device 200 may stop the reels based on information received from central determination gaming system server 106, or using a bingo game outcome.

Gaming device 200 may then determine whether the symbols displayed in the display matrix include one or more winning symbol combinations. For example, gaming device 200 may determine if there are any winning combinations of symbols along one of the activated paylines. Winning symbol combinations along the activated paylines may result in the award of prize(s) by increasing the credit value of the credit meter based on the prize(s) for such winning combination(s).

Gaming device 200 may adjust the credit balance on the credit meter in accordance with any winning symbol combinations that were identified in operation 410. Gaming device 200 may also control primary game display 240 to provide a message reflective of the game outcome. For example, when the game outcome includes one or more winning symbol combinations, the primary game display 240 may display a message such as "Congratulations—You Won X Credits!" (where X is the number of credits won by the player). Conversely, when the game outcome does not include any winning symbol combinations, a message such as "Sorry—You Didn't Win—Spin Again" may be displayed to the player.

Gaming device 200 may also, at operation 412, update the projector state to a game outcome mode. In a game outcome mode, a projector display may present video, graphics, etc., indicating the player has won. The presented information may mirror some or all of primary game display 240 in some examples. For example, the area on the floor that the projector is presented may be significantly smaller than primary game display 240. Thus, only a subset of the information on primary game display 240 may be shown in some examples. In other examples, separate messages distinct from those on primary game display 240 may be displayed. The presented information may include an indication of how much was won by the player.

At operation 414, it is determined whether a feature game trigger condition has occurred. A feature game trigger condition may be satisfied on the occurrence of one or more trigger symbols in the base game outcome, at random, or by some other process. In various embodiments, the minimum number of trigger symbols needed to trigger the feature game may be predetermined, randomly determined, or based on a wager amount, etc. In certain embodiments, the trigger symbols may be value symbols, or may be replaced with value symbols before or after the triggering of the feature game. The replacement of a trigger symbol may occur as a simple reveal animation where the trigger symbol reveals a value associated with the symbol, similar to the value symbols having a displayed value corresponding value. Such a reveal animation may further include a change in appearance of the configurable symbol, such as a change in color, shape, or other appearance of the configurable symbol, which also may also include a text indication of the trigger condition. In an example embodiment, a game triggering event will occur when at least a predetermined quantity of, such as six, configurable symbols are displayed in the base game outcome. If a feature game trigger condition has not been met, flow continues back to operation 406.

At operation 416, the projector display state may be updated. In this update, the projector display may flash words or graphics indicating a bonus game has been triggered thereby alerting other potential players. At operation 418, an outcome of the feature game may be determined, and the credit balance updated. An outcome of a feature game may lead to further triggering of another feature game. In these instances, flow may branch back to operation 414 to determine if another feature game may be activated.

At operation 420, the projector display state may be updated based on the outcome of the feature game. In some examples, the projector display may be updated during the feature game. In some instances, feature games include graphics specific to a theme of the EGM (e.g., the floor is lava). Thus, during the feature game these theme specific graphics may be displayed by the projector. There may be one or more stored animations that tied to the various feature game outcomes that may be presented by the projector display.

Figure 5:
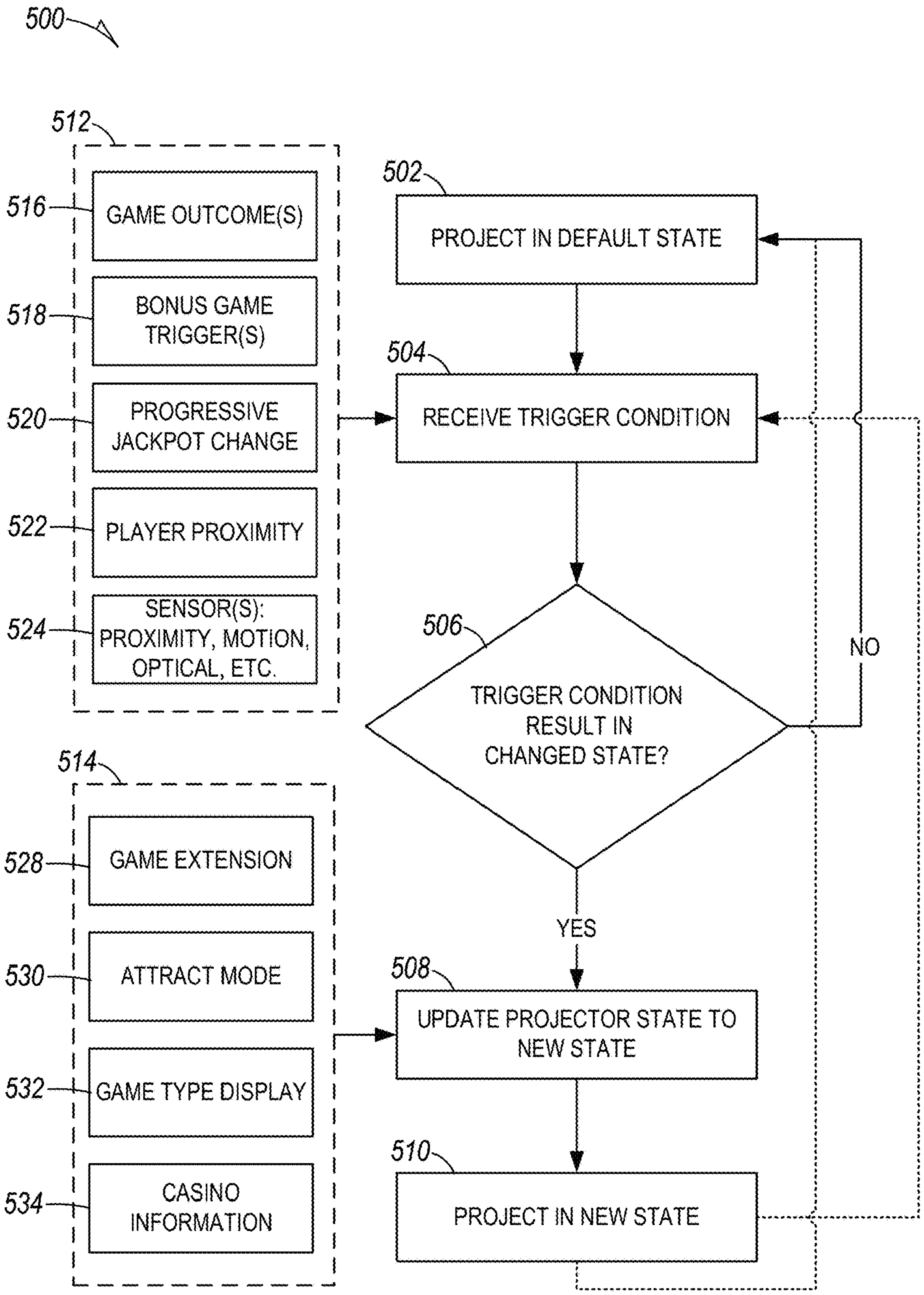
FIG. 5 is a flowchart 500 illustrating a set of operations of a process to update states of a projector display, according to various examples.

FIG. 5 is a flowchart 500 illustrating a set of operations of a process to update states of a projector display, according to various examples. The process may be implemented using gaming device 200 in various examples. Furthermore, the updates to the projector display may be performed using UI system 302, game controller 202, onboard video controller 292 or casino management system server 114, or video controller server 290, in various examples.

At operation 502, a projector display may be in a default state. As discussed in reference to FIG. 4 a default state may be an attract mode (530), in various examples. In some examples, a default state is one in which a projector display is off and it not until a potential player comes nearby that the projector display begins to present information which may be determined, for example by a sensor (see 524 in FIG. 5) located for example on or near an individual gaming device. In some examples, a sensor may provide signals for use in controlling an individual gaming device, or for controlling projector displays on multiple gaming devices 200. For example, one or more sensors may be configured to identify one or more characteristics which individually or in combination serve as a trigger condition.

Figure 12:
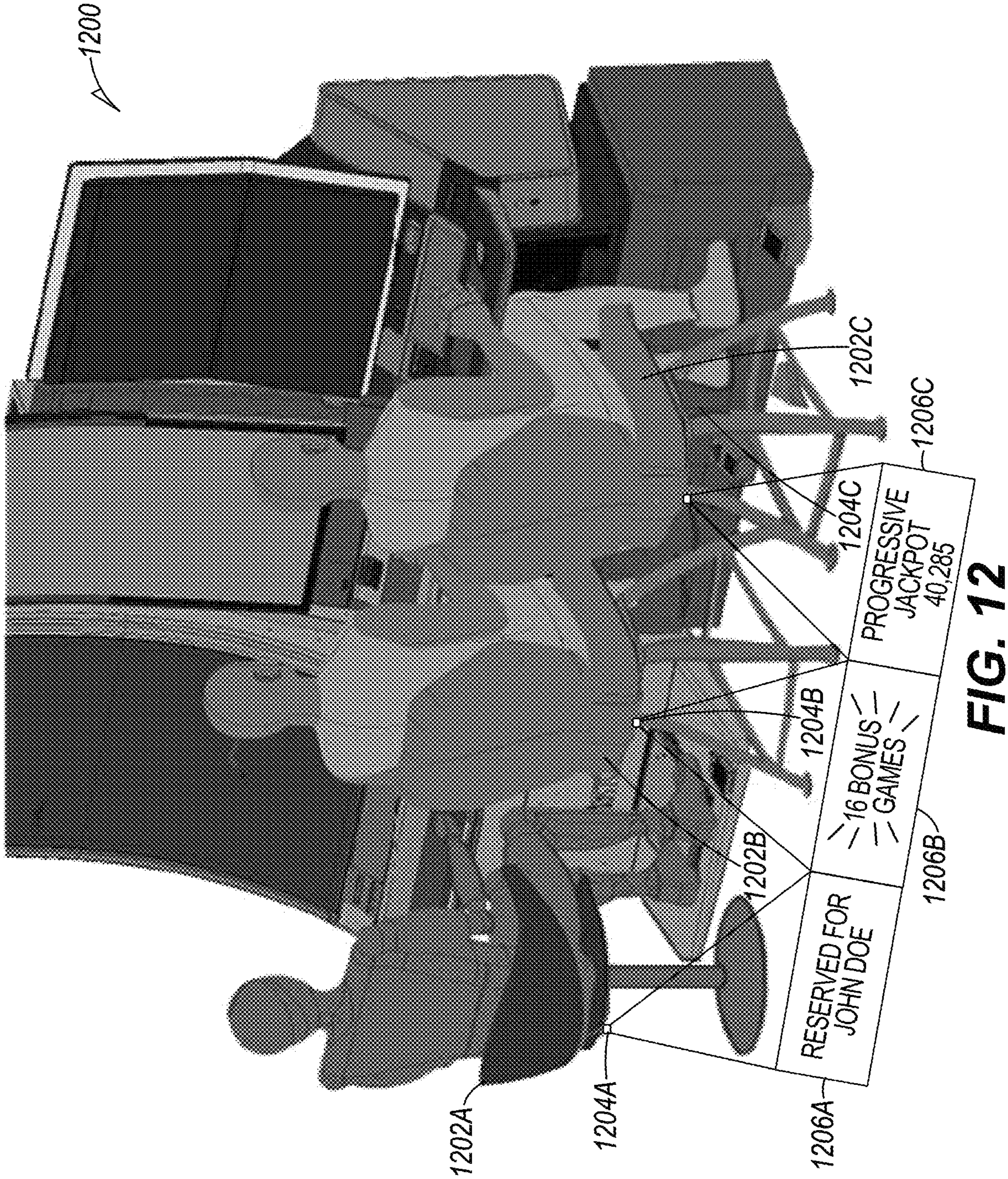
FIG. 12 is a schematic diagram 1200 of gaming devices projecting respective example content.

In an attract mode, various forms of messages may be displayed proximate a gaming device, such as messages indicating, for example, an individual gaming device is available, or is reserved for an individual player (1206A in FIG. 12), or indicating the value of a progressive jackpot associated with an open gaming device (1206C in FIG. 12). As used herein, the term "attract mode" for an image projector includes display of any text or graphic images configured to attract attention to one or more types or themes of gaming devices or individual gaming devices available for play (see FIG. 15, message 1502, "win now").

In some examples a projector display displays a static image based on a physical cutout or other template that may be swapped in and out; and selected implementations, images will be changed electronically through accessing a digital file representing a selected static image. For example, for a slot tournament the projector display may turn on to indicate that a gaming device is part of the tournament.

At operation 504 a trigger condition may be received. There may be several types of trigger conditions. FIG. 5 illustrates five such triggers as trigger conditions 512, but there may be others. For example, a game outcome 516, or a bonus game trigger 518, may represent a trigger condition for video controller to control a projector to enter a game extension mode 528, and display a message tied to an event, such as a game outcome (for example, an award of bonus games, see 1206B in FIG. 12). In other examples either of such conditions 516 or 518, might trigger a game type display mode 532, in which at least a portion of the main display of a gaming device is displayed by the image projector.

A trigger condition may be received and initiated in a number of ways. For example, one of server computers 102 may receive the trigger condition and transmit an instruction to one or more projector displays on one more gaming devices to update their states. In the case of a game outcome trigger, a single gaming device (e.g., gaming device 200) may detect the trigger and update its own projector displays. In another example, for a bonus game trigger condition, multiple gaming devices that are adjacent to the gaming device that has the bonus game may receive the trigger. In another example, progressive system server 112, or video controller server 290 may determine there is a winner of a progressive jackpot or a threshold progressive jackpot change.

In various examples, subject to regulatory requirements and player consent, a trigger condition may be player proximity to a gaming device. The proximity may be detected in a number of ways including, but not limited to, near-field communication (NFC) between a mobile device of the player and a gaming device, wi-fi direct, Bluetooth, signal triangulation, motion sensors, and facial recognition, for example. As may be appreciated, a player proximity trigger 522 may rely on proximity detection methods (e.g., NFC) identifying a specific player is nearby; whereas others sensor-based triggers 524 (e.g., proximity sensors, motion sensors optical or audio sensors) identify that someone is nearby. Such sensors may be adapted to identify a number of sensor inputs relative to proximity or motion, and/or motion are optical sensors to depict activity, such that one person walking proximate the gaming device would not represent a trigger, but the noise and/or movement of 10 persons, for example, would be a projector trigger condition. The At operation 506 it is determined whether a trigger condition received at operation 504 results in a changed state for a projector display. Not all projector displays will necessarily react the same to the same trigger condition. For example, consider that the trigger condition is a progressive jackpot change above some threshold amount. If a projector display is part of a first gaming device that is currently in use, it may not change state from game extension mode (e.g., is displaying symbols related to the currently played game, or depicting an indicator of a bonus game award). Yet, a second gaming device right next to the first gaming device may change state to display the new jackpot value. The decision logic of when to change state may be stored as a set of if/then rules, according to various examples. As noted previously, if selected examples, the identification of a trigger condition and also of any action to be taken in response, may be under the control of an onboard video controller 292 or a networked video controller server 290.

At operation 508, a projector display may be updated to a new state (e.g., operation 510) if the trigger condition, with respect to that individual projector display, results in an updated state. In selected examples, an individual trigger condition may result in controlling the projector display present any one (or more) of multiple possible images. In some examples, the possible images may be displayed in a predetermined order, or may be randomly selected for display. FIG. 5 illustrates four projector states 514, but there may be more without departing from the scope of this disclosure (e.g., there may be a service mode that projects content indicating an EGM need service-see 1008 in FIG. 10). In various examples, the sound of a gaming device may be tied to what is being shown by the projector display.

In instances where a player may be identified (such as through a BLE beacon or NFC), the updated state may include player specific content (subject to regulatory restrictions and player consent). The player specific content may include, personalized messages, custom avatars, player status, directed content based on player history (for example, a game play feature common to the player's previously played games), free drink messaging, etc. When tracking is used, projector displays in the eyesight or path of the player may updated in sequence as the player moves through a casino. Accordingly, as a player walks through a casino projector displays turn on as they approach a gaming device and turn off (or change state) after they pass by. When in a casino information mode, the content may include drive orders, order numbers (e.g., for casino staff to utilize), live odds, live sports scores, etc. In some examples in which player identification is implemented, one or more gaming devices may control the projector display to identify an individual machine to the player (potentially in response to a player request to reserve a machine received at casino management system server 114), see 1206A.

Figure 6:
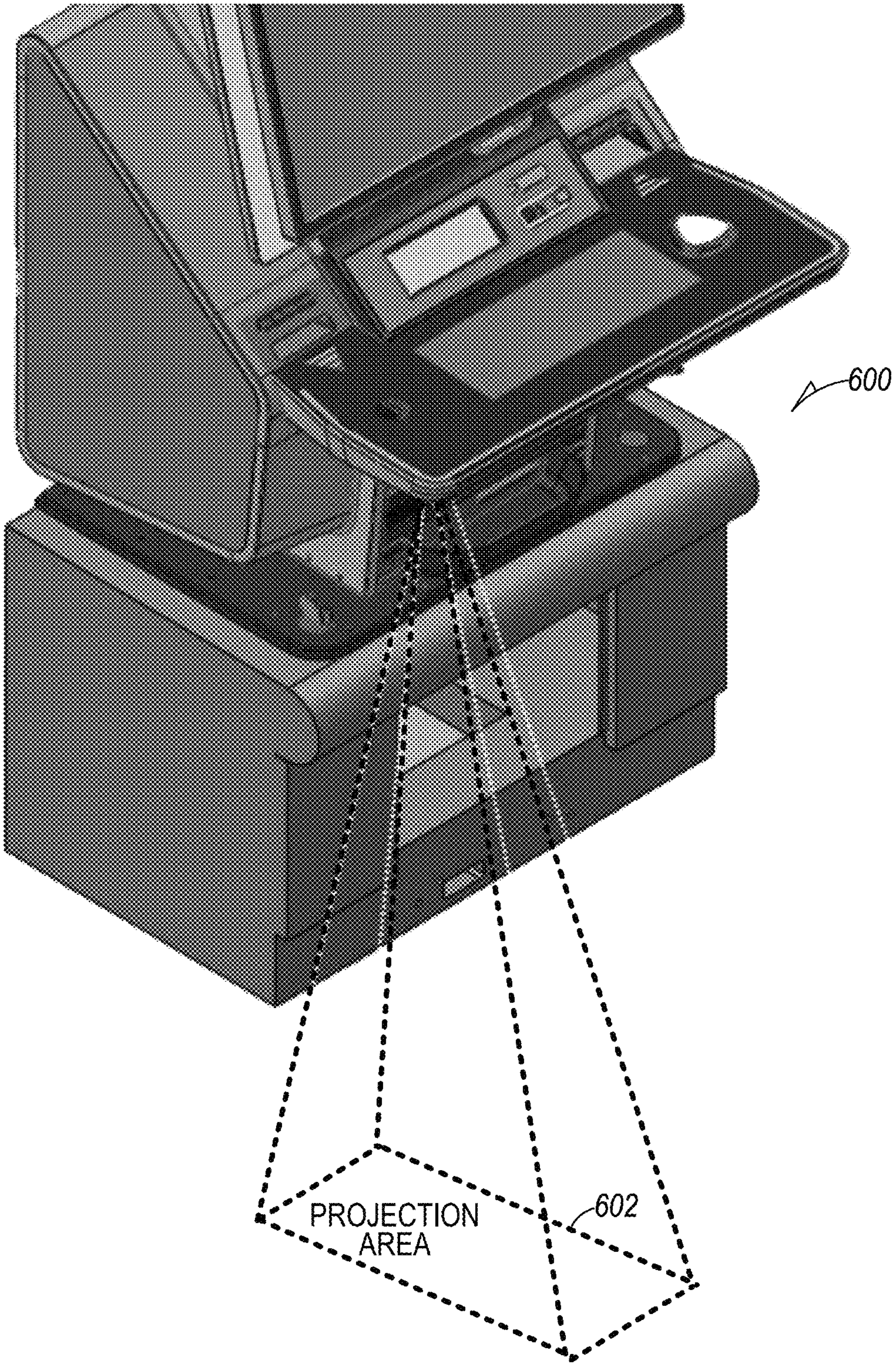
FIG. 6 is a schematic diagram of a gaming device 600 with a projector display, according to various examples

FIGS. 6-9 are schematic diagrams of example possible gaming device configurations incorporating projector displays. For example, FIG. 6 is a schematic diagram of a gaming device 600 with a projector display, according to various examples. As illustrated, there is a projection area 602 coming from a projector that has been placed beneath the button deck of the gaming device (See also, FIG. 8).

Figure 7:
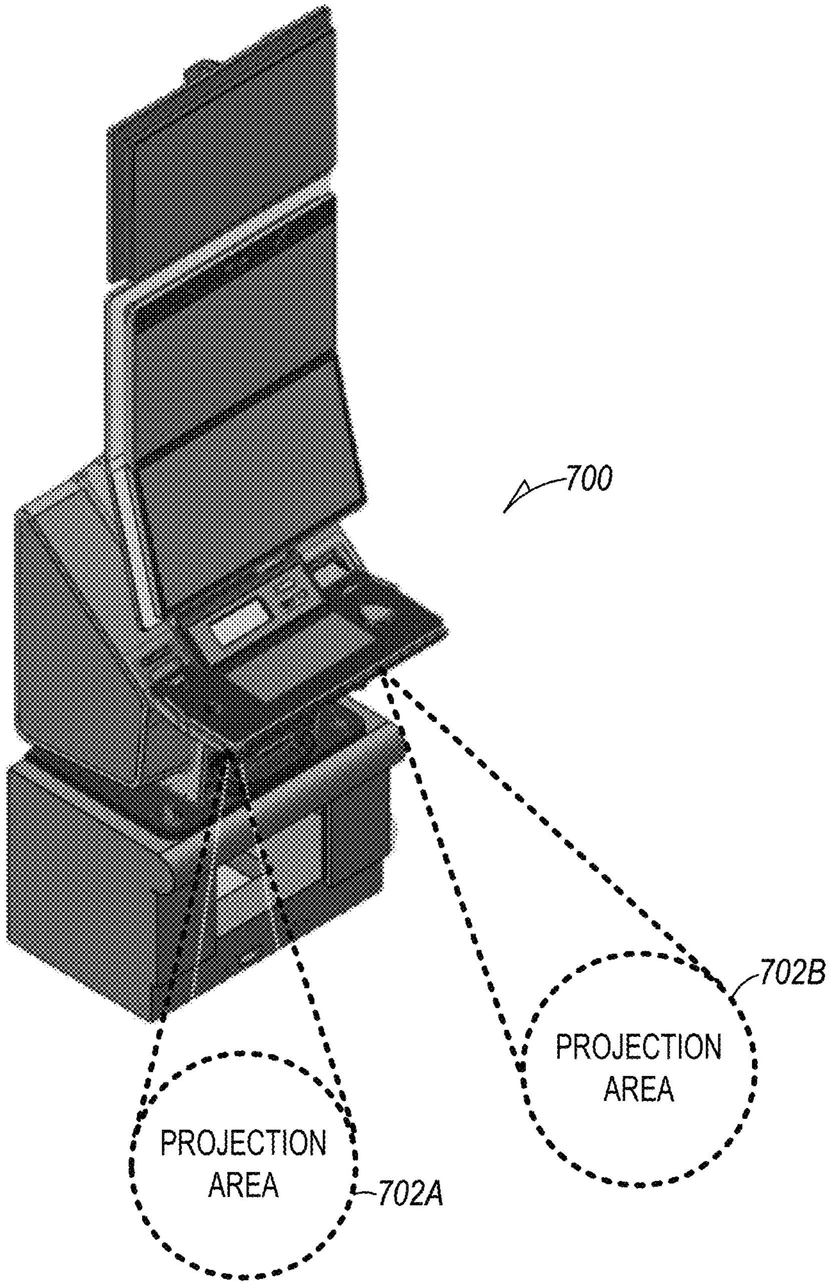
FIG. 7 is a schematic diagram of a gaming device 700 with two projector displays, according to various examples.

FIG. 7 is a schematic diagram of a gaming device 700 with two projector displays projecting to two image areas 702A, 702B, according to various examples. In this example, the use of two projectors allows more flexibility than with a single projector. For example, one projector may be managed by the casino and be configured to present information or advertisements and the second projector's state may be tied to the gaming device. In some examples, the two projectors display the same information. In some examples, the display areas of the two projectors may act as a single display. For example, an animation that begins on one may continue to the other. The use of two displays also provides redundancy should one of the projectors be blocked.

Figure 8:
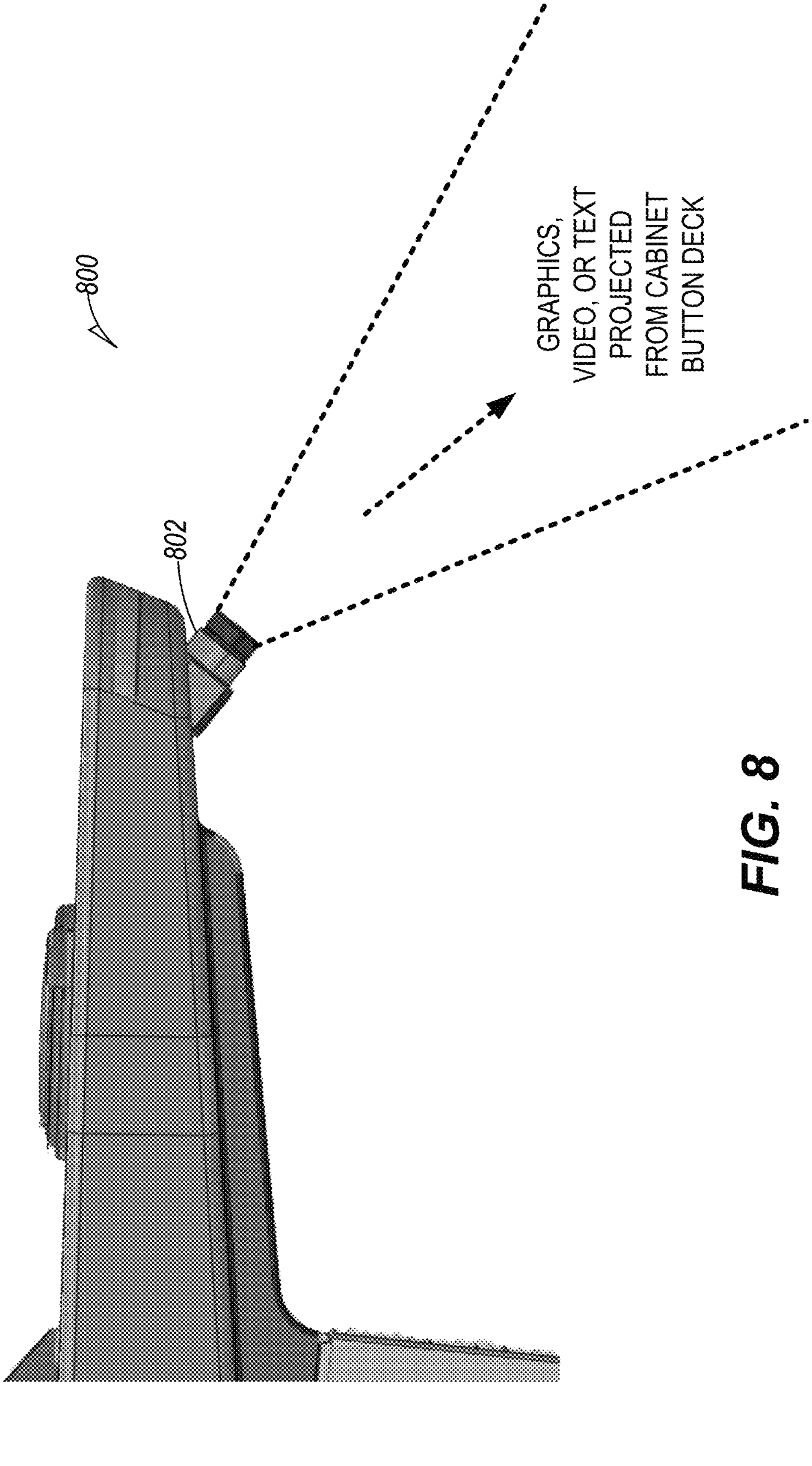
FIG. 8 is a side-view schematic diagram of a gaming device 800 with a projector display, according to various examples.

FIG. 8 is a side-view schematic diagram of a gaming device 800 with a projector display, according to various examples. As can been seen, the projector may be angled instead of pointing straight down, to achieve the desired placement of the projection area. The angle of the projector may be used to increase or decrease the size of the projection area in various examples. The projector may be configured with a parallax-adjusting lens assembly or digital correction assembly, to provide a desired projected image shape at a desired location.

Figure 9:
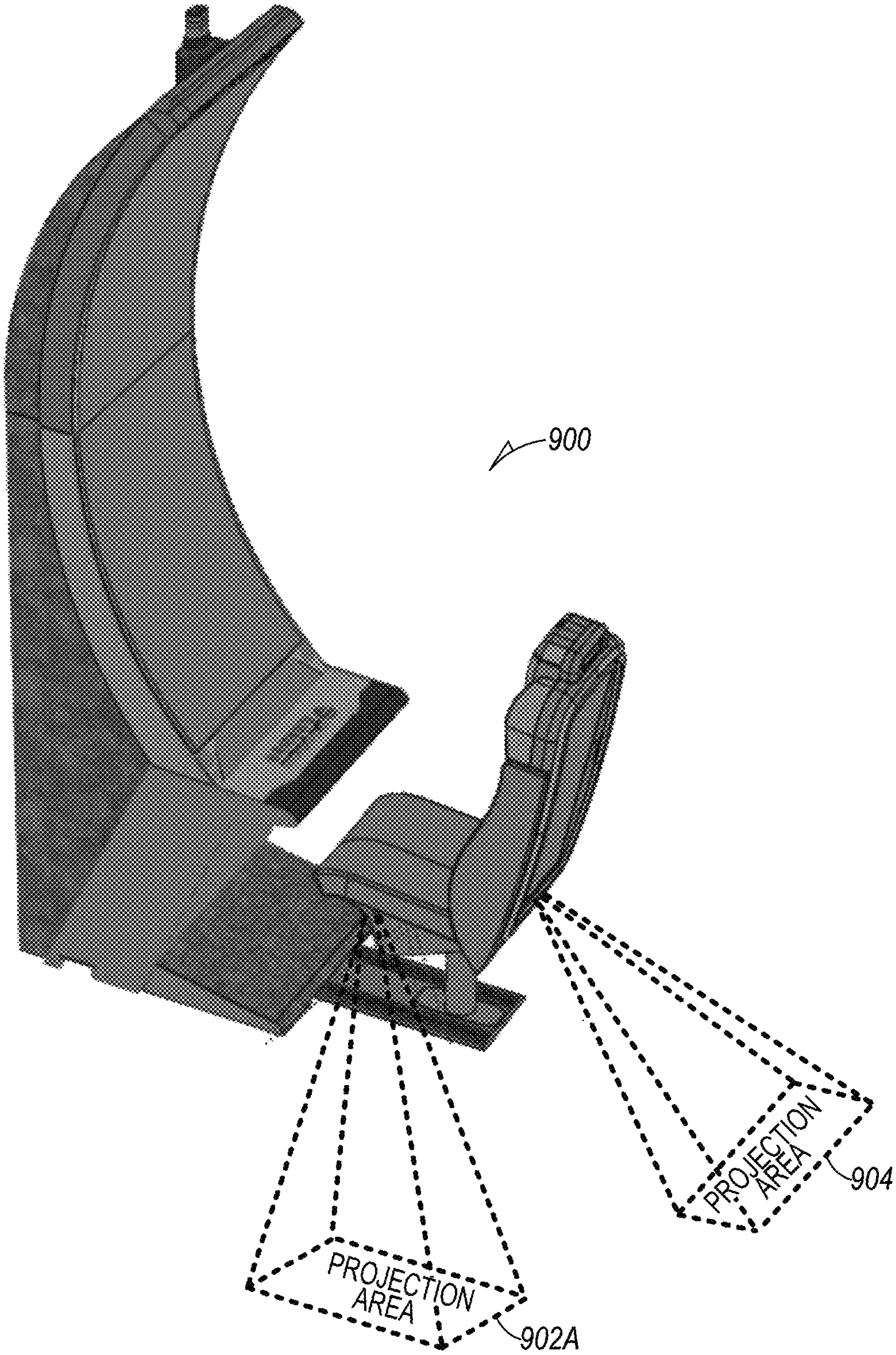
FIG. 9 is a schematic diagram of a gaming device 900 with two projector displays attached to a chair of the gaming device, according to various examples.

FIG. 9 is a schematic diagram of a gaming device 900 with two projector displays attached to a chair of the gaming device, according to various examples. The use of projector displays on a chair provides a few advantages over using projectors on the button deck. For example, in some instances there is a display on the back of the chair. The projection area beneath the chair may act as an extension of the display on the back of the chair providing a more immersive user experience. Another advantage of using a projector on the chair itself is the reduced likelihood that a player's leg would get in the way of the projection. Location of the projector on the chair may be expected to enable use of a lower output projector (in lumens) to provide an image of a desired brightness on a floor surface, relative to placement in a higher location on the gaming device, reducing power of the system. In selected embodiments, one or more projectors may be mounted on the seat post, a stationary seat pan, or other fixed support member of the chair so that the projection area is a fixed position regardless of chair movement (as may occur when persons are sitting down or rising). That provides the further advantage with multiple gaming devices of avoiding distracting random movement of projection areas; and also, potentially enables configuring the imaged area from projectors on multiple gaming devices to be synchronized, and/or otherwise combined to present a composite image (either static or video close present from the multiple imaged areas. Thus, as discussed relative to FIG. 7, the projection areas of multiple projectors on an individual gaming device may be controlled to function as a single display; and projection areas of multiple gaming devices may be configured and controlled to function as a single display, as discussed in more detail relative to FIGS. 13A-B and 14A-B. Additionally, the example image projector positioning of FIGS. 7-9 may be combined with one another, with one or more image projectors mounted under the button platform, and one or more image projectors mounted on the gaming device seat; with the respective images for each controlled individually or in coordination with one another, as evidenced by the discussions herein.

Figure 10:
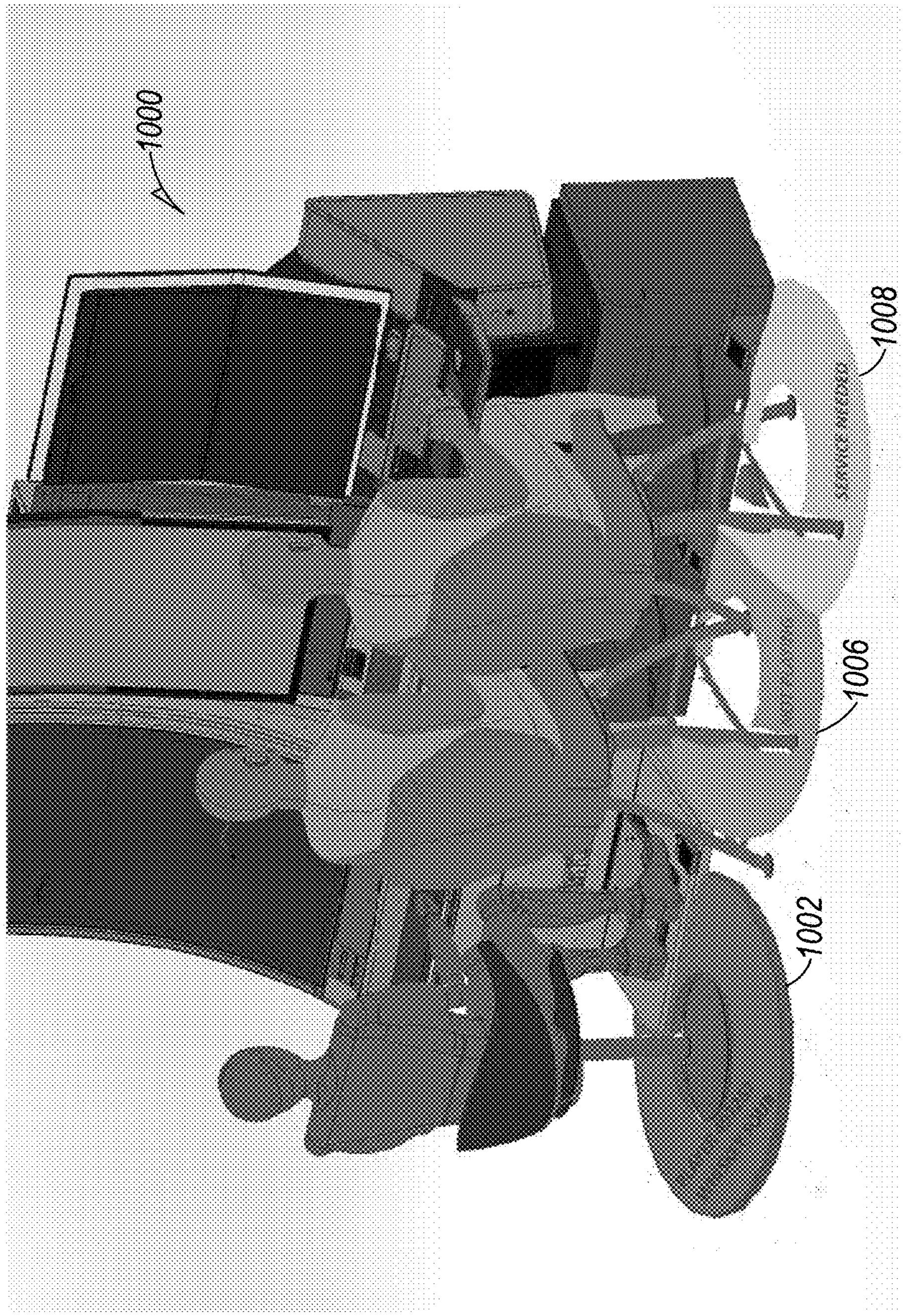
FIG. 10 is a schematic diagram of a bank 100 of three gaming devices projecting content, according to various examples.

FIG. 10 is a schematic diagram of the projection content from respective projectors of three gaming devices, according to various examples. As shown, there is a bank 1000 of three EGMs each with a different projector state. The example of FIG. 10 uses circles—which may change color depending on projector state or content—to display information, but other shapes may be used without departing from the scope of this disclosure. The first EGM 1002 is showing player information "player 497267," and a drink preference "whiskey sour," the second EGM 1004 is showing that no one is currently playing a game, and the third EGM 1006 indicates "service needed." As a result, referring to flowchart 500 of FIG. 5, first EGM 1002 may display the depicted image in response to an identifying player proximity indicator (522), such as through a BLE beacon or NFC communication. Second EGM 1004 may display the identified indication either as a default attract mode 530, or in response to the absence of a signal from a localized motion or proximity sensor (582), or the absence of a signal of activity from game controller 202. The third EGM 1006 may display the identified "service needed" message in response to an error condition identified by game controller 202, bill validator 234, or other components of gaming device 200.

Figure 11:
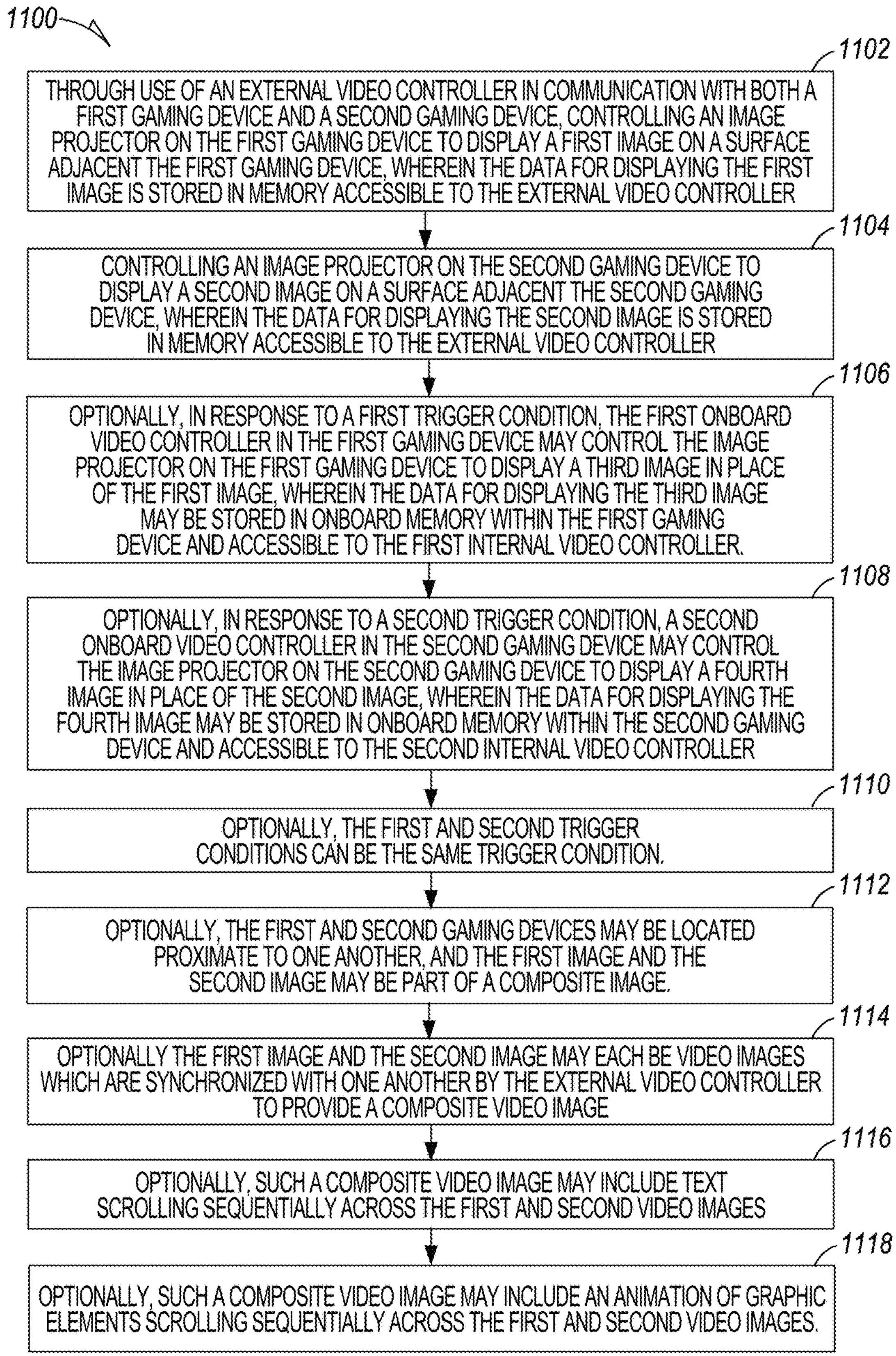
FIG. 11 is a flowchart 110 describing an example set of operations for operating multiple gaming devices having one or more respective projector displays.

FIG. 11 depicts a flowchart 1100 depicting operations of an example method for displaying projected images from multiple gaming devices. The method can be performed, at least in part, through use of an external video controller in communication with both a first gaming device and a second gaming device. An example configuration, the external video controller may be in the form of a video controller server (290) in communication across a network with the first and second gaming devices. In other examples, the external video controller could be contained within an individual EGM, but could operate to control separate EGMs as the first and second gaming devices. In selected examples, such a video controller server may be a multi-port video controller wherein respective ports are coupled to projector displays on separate gaming devices.

As indicated, the method includes, through use of the external video controller, controlling an image projector on the first gaming device to display a first image on a surface adjacent the first gaming device (i.e. in selected examples, the surface will be separate from the gaming device, such as a floor, wall or other surface proximate or supporting the gaming device), wherein data for displaying the first image is stored in memory accessible to the external video controller (for example, in associated memory forming a part of or accessible to the external video controller as described relative to video controller server 290).

As indicated at 1104, the method further includes controlling an image projector on the second gaming device to display a second image on a surface adjacent the second gaming device, wherein data for displaying the second image is stored in memory accessible to the external video controller.

Optionally, as indicated at 1106, the method includes, in response to a first trigger condition utilizing a first onboard video controller (292) of the first gaming device to control the first image projector to display a third image in place of the first image, wherein data for displaying the third image is stored in onboard memory (294) within the first gaming device and accessible to the first on the first onboard video controller.

Further optionally, as indicated at 1108, the method includes, in response to a second trigger condition, utilizing an onboard video controller (292) of the first gaming device to control the second image projector to display a fourth image in place of the second image, wherein data for displaying the fourth image is stored in onboard memory (294) within the second gaming machine and accessible to the second onboard video controller.

Optionally, as indicated at 1110, the first and second trigger conditions can be the same trigger condition. As discussed relative to FIG. 5, various trigger conditions can be determined either specific to the gaming device, such as a game outcome 516, a bonus game trigger 518, an individual player proximity 522, for some other sensors 524; while others trigger conditions may be established external to an individual gaming device, such as progressive jackpot changes 520, or other types of sensors 524. For example, proximity or motion sensors may be used to identify player traffic along one or more banks of gaming devices; and those trigger conditions may be communicated to one or more of a video controller server and/or one or more onboard video controllers, and in the receiving video controller server and/or onboard video controller(s) can control images of the projector display(s) 288 accordingly.

Figure 14A:
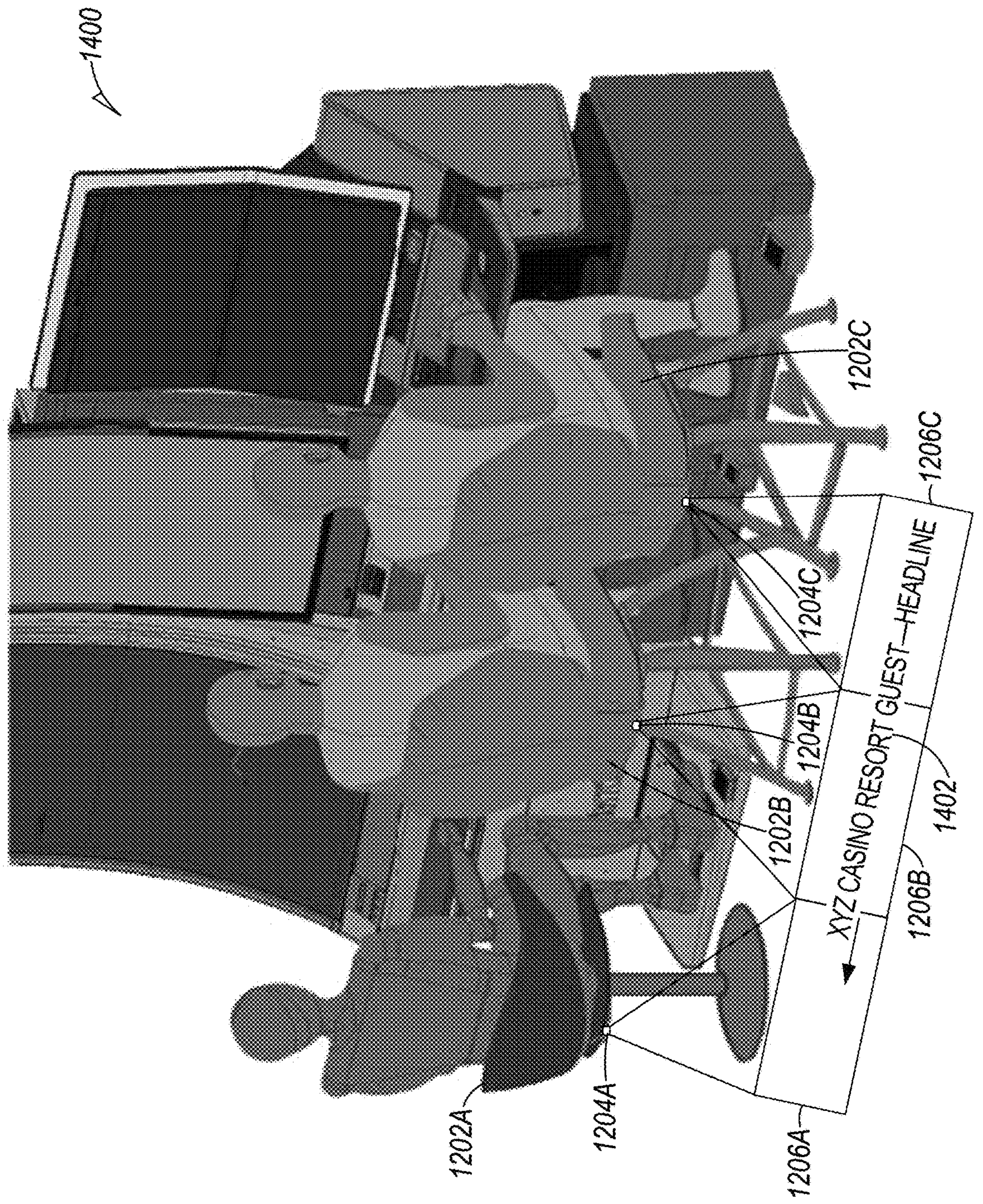
FIGS. 14A-B are schematic diagrams of multiple gaming devices 1400 projecting respective portions of a composite animated textual image at respective points in time.
Figure 14B:
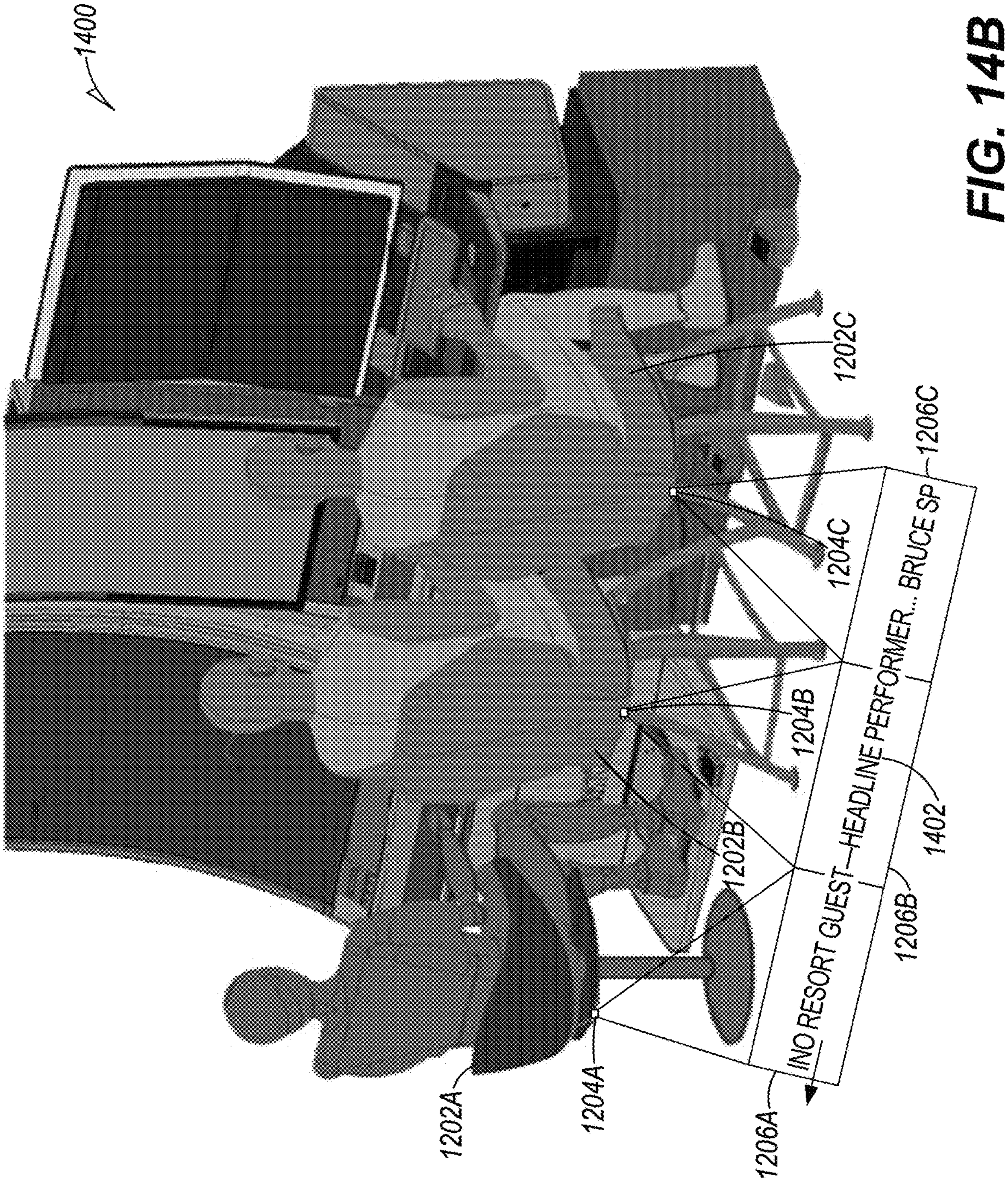

Optionally, as indicated at 1112, the first and second gaming devices may be located next to one another, the display area for the first image and the display area for second image may be contiguous with one another such that the first image in the second image form respective portions of a composite image, displaying static or video content. In establishing such an example, placement of the projection display area may potentially be achieved either achieved by manual adjustment projector displays 288; or remotely through use of controllable lenses, as discussed relative to FIG. 2A. In either type of configuration, the adjustment may benefit from either video controller server 290, or respective individual onboard video controllers 292 causing display of a reference or calibration image, which in some examples may include a QR code, barcode or other machine-readable image which may be detected to identify individual gaming device projectors and their relative image placement in a multiple gaming device configuration. In examples in which composite static or video images are to be displayed, the individual display areas can be positioned relative to one another, and parallax corrected (as described earlier herein), to cooperatively define a composite video image display area. The Optionally, as indicated at 1114, where under at least some circumstances (such as in response to selected trigger conditions) a composite video image will be displayed; video controller server 290 may send not only respective video data of the composite video image to the involved gaming devices, but also synchronization signals and other control signals to enable displaying the composite video image from the involved projector displays 288. In other examples, though operation of projectors of multiple gaming machines may be under control of video controller server 290, the static or video image data may be locally stored in the individual gaming devices and retrieved in response to control signals from video controller server 290. As a result, the described system would enable a composite video image with text as a composite image which could include, for example, text scrolling sequentially across the composite video image formed from the first and second projection display areas, as indicated at 1116. An example is depicted in FIGS. 14A-B, depicting a bank of (three) gaming machines 1400, arranged adjacent one another, with each gaming device including a respective projector display 1204A-1204C, on a respective gaming device chair 1202A-1202C. Each projector display projects a respective image to a respective display area 1206A-C, which are configured to be contiguous with one another such that the respective images form a composite image. In the depicted example, the projector display is in casino information mode 534, and textual information 1402 regarding a performer at the casino scrolls from right to left (as can be seen from a comparison of FIGS. 14A-B).

Figure 13A:
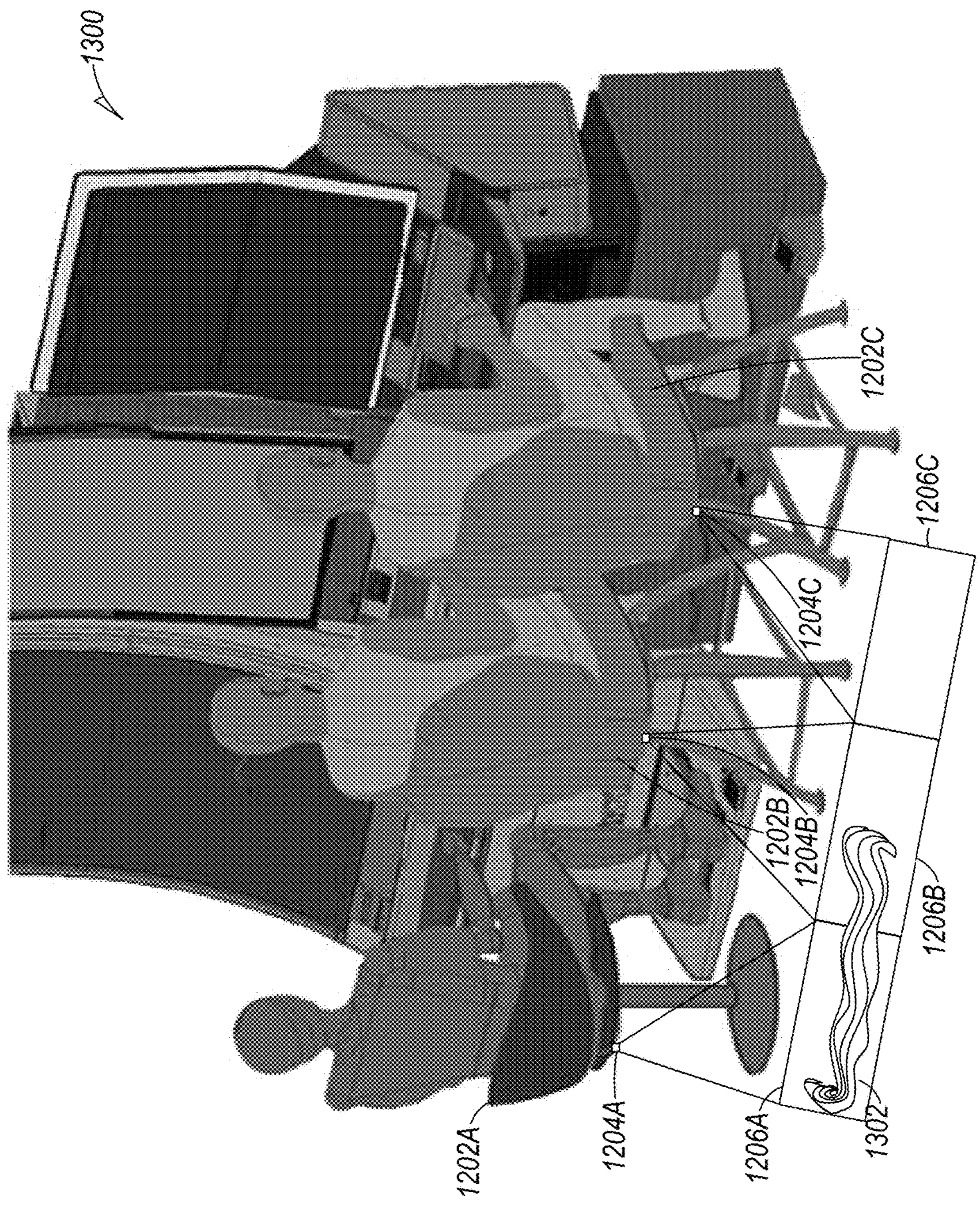
FIGS. 13A-B are schematic diagrams of multiple gaming devices 1300 projecting respective portions of a composite video image at respective points in time.
Figure 13B:
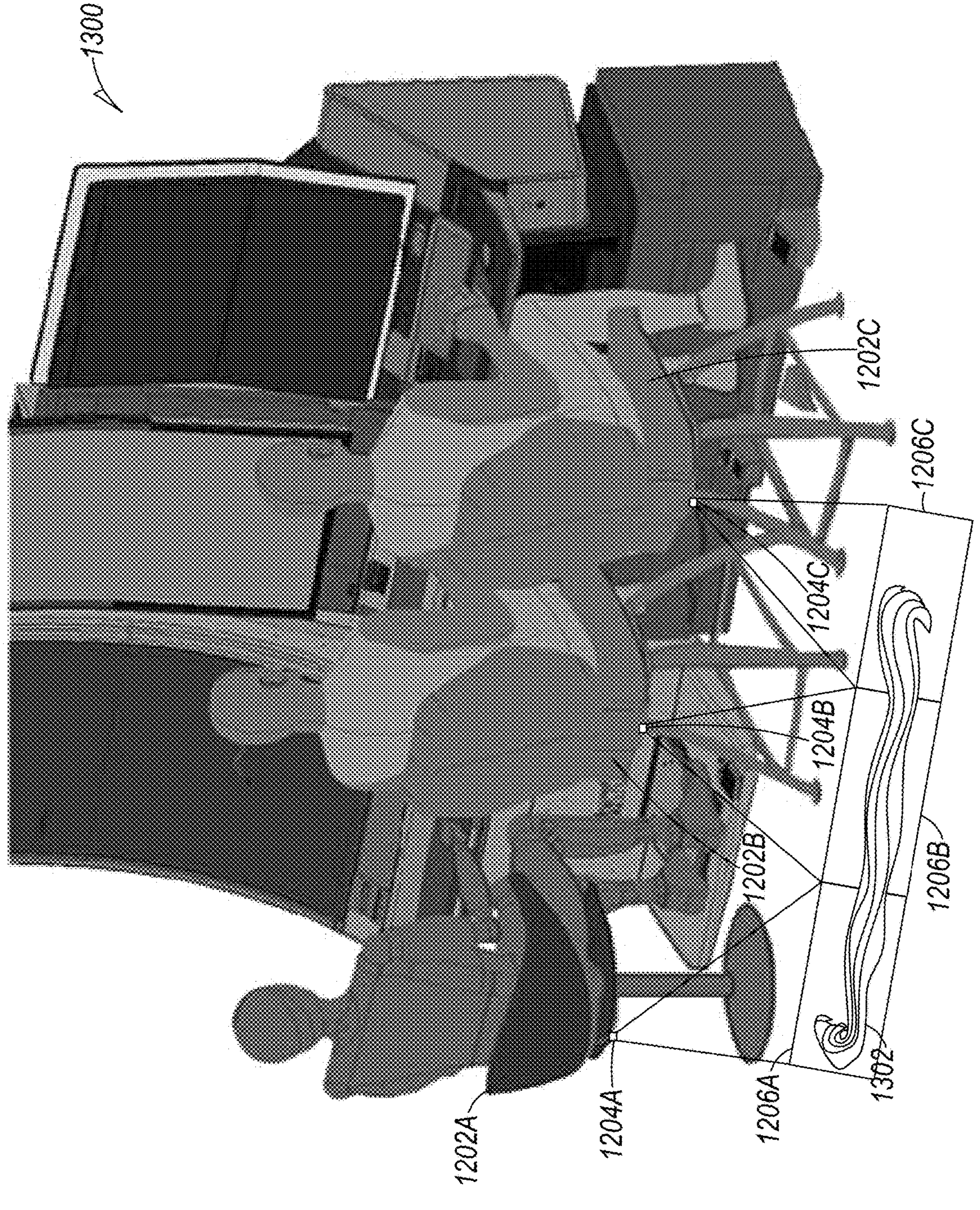

Alternatively, in various examples the composite video image may include an animation of graphic elements moving sequentially across the first and second projection display areas of the composite image, as depicted relative to a bank of gaming machines 1300 depicted in FIGS. 13A-B. In the depicted example, an animation of a wave 1302 moves from left to right, as can be seen from a comparison of FIGS. 13A-B.

Figure 16:
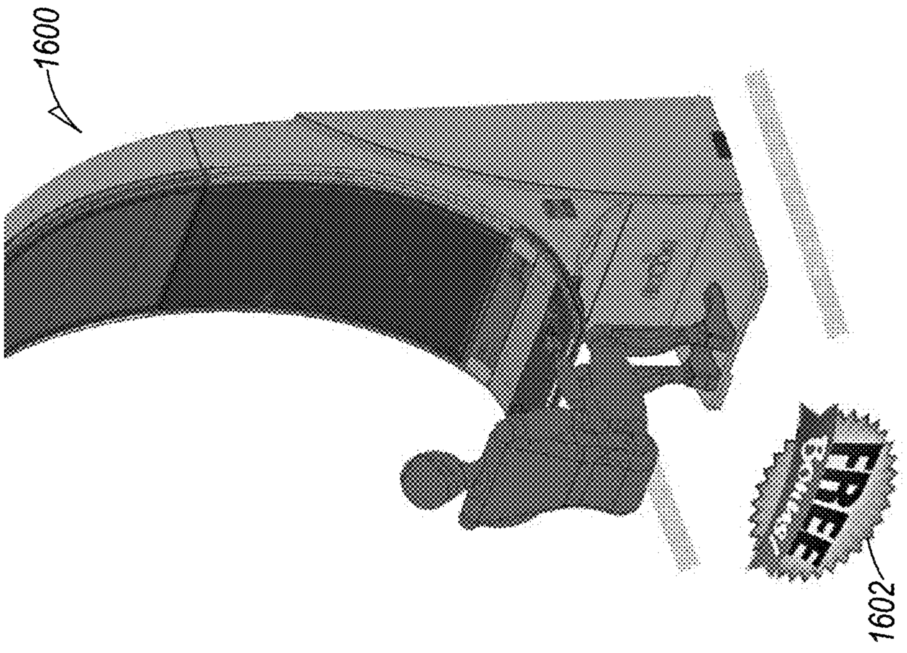
FIG. 16 is a schematic diagram of a gaming device projecting example content in response to a second example status of the gaming device.
Figure 15:
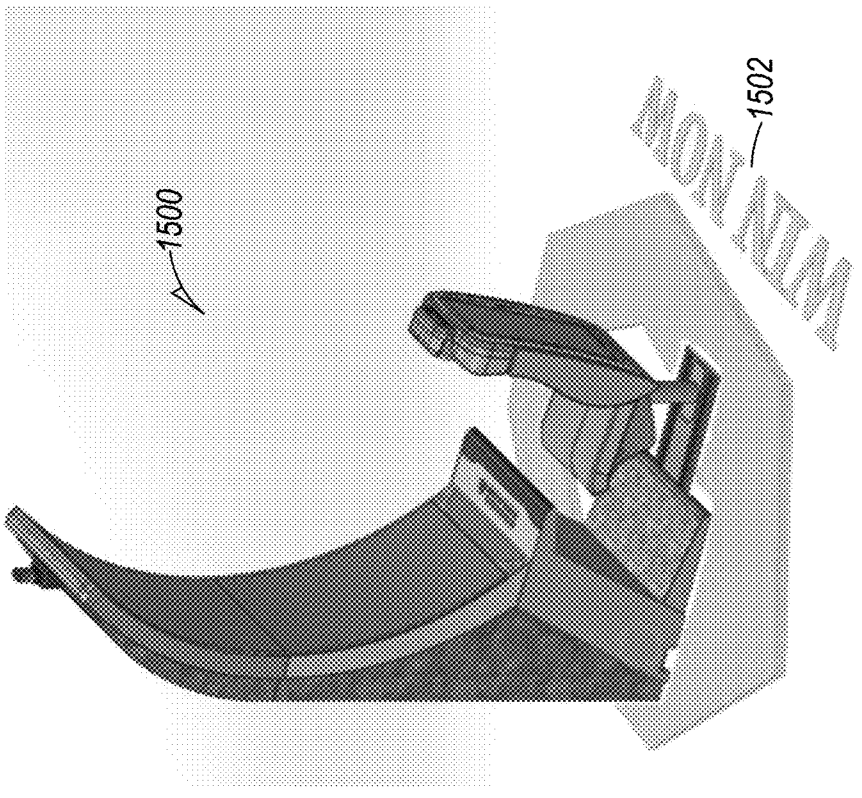
FIG. 15 is a schematic diagram 1500 of a gaming device projecting example content in response to a first example status of the gaming device.

FIGS. 15-18 are schematic diagrams of gaming devices projecting content, according to various examples. FIG. 15 depicts a gaming device 1500 displaying a message suitable for an attract mode (530). FIG. 16 depicts a gaming device 1600 depicted in a message "free bonus", which could be triggered in response to a bonus game trigger 518, and therefore reflect a game extension mode 528, indicating activity within the ongoing game.

Figure 17:
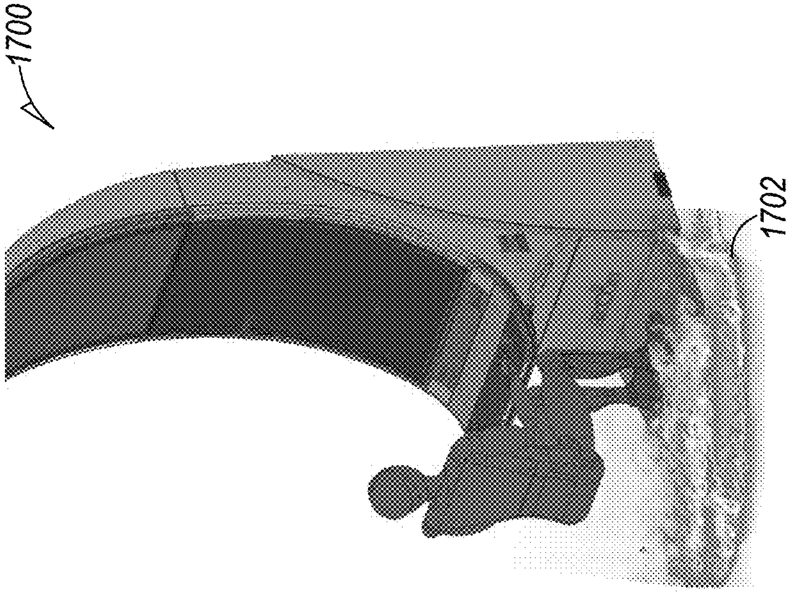
FIG. 17 is a schematic diagram of a gaming device projecting an example of video (animated) content.

FIG. 17 depicts a gaming device displaying an animation (in an example of fire), behind and on either side of the gaming chair, as can be projected with a combination of the image projectors of FIG. 7 in combination with one or projectors of FIG. 9. And is further described relative to FIGS. 12 and 13A-B, where multiple projectors are used to display an animation, the projectors may be synchronized by the onboard or external video controller to present a composite image such as that of FIG. 17.

Figure 18:
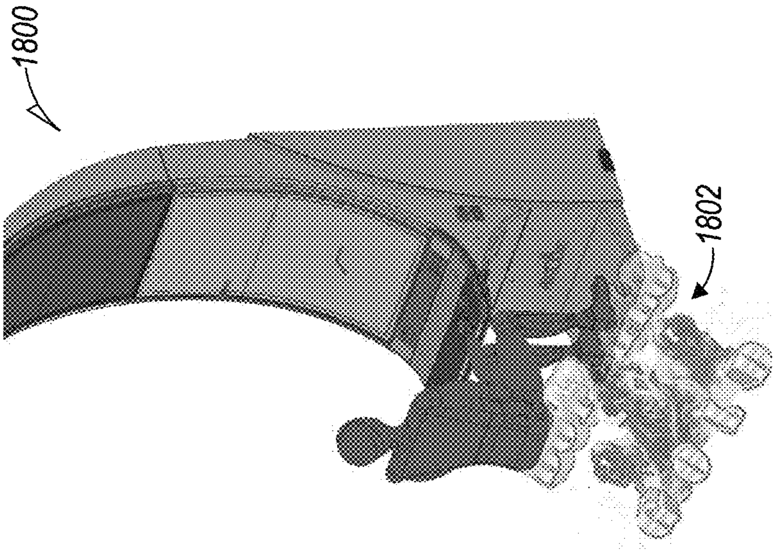
FIG. 18 is a schematic diagram of a gaming device projecting a further example of video (animated) content.

FIG. 18 depicts a gaming device 1800 projecting an image 1802 beneath and behind the gaming chair. In the example, the display is of an image of multiple buffalo, with the word "Buffalo" above the image, and "gold" below the image, providing an example of a game type display mode 532, in which images associated with an ongoing (or potential) game, are displayed. In the above depicted examples, for purposes of the present exposition, image display areas are generally depicted as either rectangular or circular. However, individual images may be formatted to be either rectangular, circular, or of any other desired form; such that changing of images may result in a different size and/or shape of image relative to a preceding or following image. In other words, the underlying image data may dictate the display area for any individual image. Though in circumstances in which multiple projectors will display a composite image, the images will be similarly formatted to provide sufficient uniformity to provide a composite image.

Figure 19:
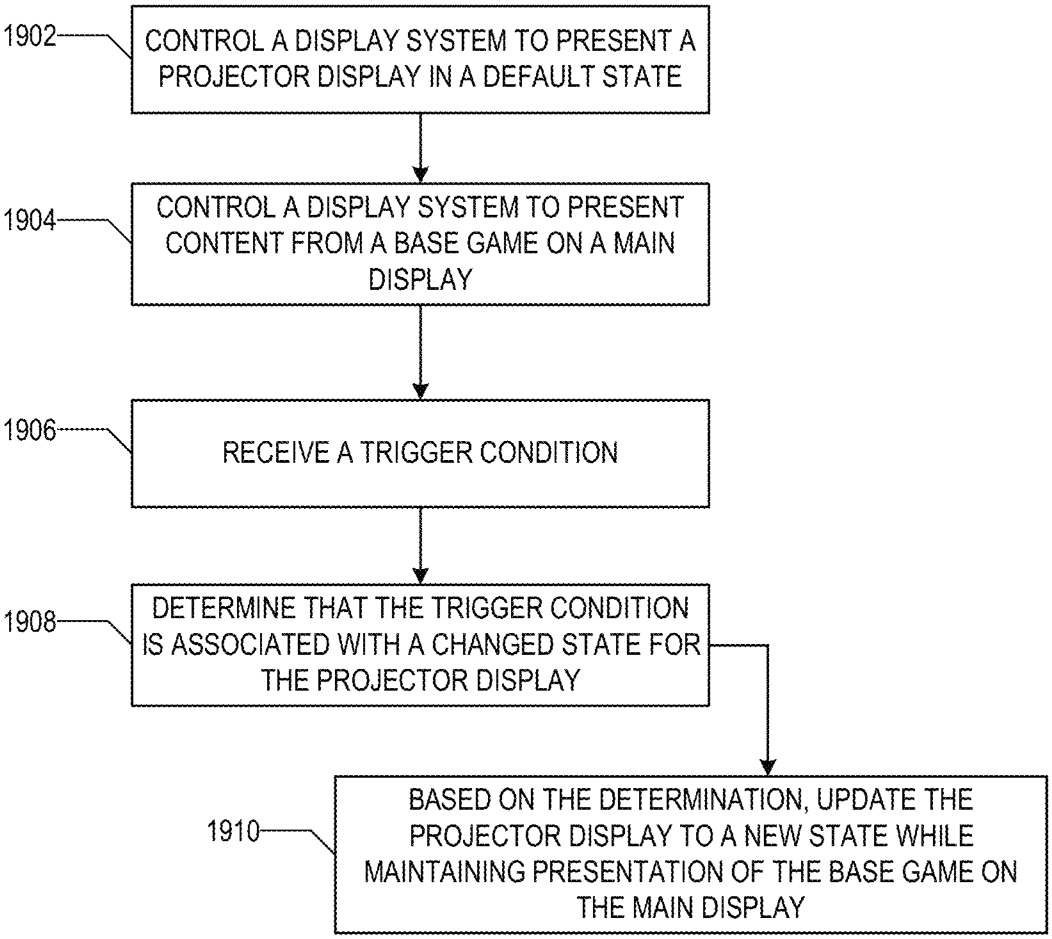
FIG. 19 is a flowchart describing a set of operations of a process to update the state of a projector display, according to various examples.

FIG. 19 is a flowchart 1900 illustrating a set of operations of a process to update the state of a projector display, according to various examples. The process may be implemented using gaming device 200 and the components illustrated in FIG. 3, in accordance with various examples. For example, a control system of a gaming device (e.g., gaming device 200) may execute instructions on one or more processors of the gaming device to cause the gaming device 200 to perform the operations of FIG. 19. The gaming device may include a main display (e.g., main display 128) and a projector display (e.g., projector 154). A display system (e.g., as part of game controller 202) may control what is presented on each display.

At operation 1902, the control system controls the display system to present the projector display in a default state. For example, the default state may be to display a game type of the gaming device. At operation 1904, the control system controls the display system to present content from a base game on the main display. For example, a player may be wagering using the methodology described in FIG. 4.

At operation 1906, a trigger condition is received. The trigger condition may be a proximity of a player to the gaming device or a progressive jackpot change. At operation 1908 it is determined that the trigger condition is associated with a changed state for the projector display. The changed state may be to switch from the default state to displaying player specific content when the trigger condition is a player proximity. The changed state may be a progressive jackpot state when the trigger condition is a progressive jackpot change. In other examples, the changed state may be to display game-related content, such as a demonstration of game play of the machine, for example, display of a game play triggering event (such as screens representing, for example, an award of credits, a change in reward values, unlocking or modifying a feature game, etc.).

In various examples, projector displays that are adjacent to the gaming device may be updated as well based on a changed state. For example, if the trigger condition is a player entering a feature game, all the adjacent (e.g., left or right) gaming devices may receive instructions to update respective projector display states to a bonus game trigger state. Some trigger conditions may involve receiving projector control signals from a server computer, as discussed earlier herein relative to FIGS. 2A-C. In some system configurations, the content for the projector display(s) in response to trigger conditions may be entirely under the control of the individual gaming machine physically supporting the projector display(s), such as through a projector UI 324, in FIG. 3.

At operation 1910, in various examples, the projector display may be updated to a new state while maintaining presentation of the base game on the main display.

What is claimed is:

1. A gaming device, comprising:

a display system comprising a main display and a projector display, the projector display operable to project an image on a surface adjacent to the gaming device; and a control system comprising one or more processors and memory storing a plurality of instructions, the control system including a video controller, and wherein the instructions, which, when executed, cause the one or more processors to:

conduct a game on the gaming device, including presenting information regarding the game on the main display;

instruct the display system to project the image on the surface adjacent to the gaming device using the projector display in a default state;

control the display system to present content from a base game on the main display while the projector display is in a default state;

receive a trigger condition;

determine that the trigger condition is associated with a changed state for the projector display;

when the trigger condition is associated with the changed state for the projector display, through use of the video controller, update the projector display to a new state while maintaining presentation of the game on the main display; and using the video controller and based on the trigger condition placing the projector display in the new state, control the projector display to update the image on the surface adjacent to the gaming device.

2. The gaming device of claim 1, wherein the trigger condition is a proximity of a player to the gaming device and wherein the new state causes the one or more processors to control the display system to display player specific content using the projector display.

3. The gaming device of claim 1, wherein the trigger condition is a progressive jackpot change and wherein the new state causes the one or more processors to control the display system to display jackpot information associated with a progressive jackpot using the projector display.

4. The gaming device of claim 1, wherein the instructions, when executed, further cause one or more processors to:

transmit instructions to another gaming device to update a state of a projector display of another gaming device.

5. The gaming device of claim 1, further comprising an attached chair assembly, and wherein the projector display is mounted on the attached chair assembly.

6. The gaming device of claim 1, wherein the default state comprises an attract mode, wherein the video controller accesses a first image file and controls the projector display to project a first static image.

7. The gaming device of claim 1, wherein in the new state the video controller accesses a second image file and controls the projector display to project a second image wherein the second image file is a video file, and wherein the second image is a video image.

8. A gaming system, comprising:

a first gaming device, the first gaming device having at least a first projector operable to project images from the first gaming device onto a surface adjacent to the first gaming device;

a second gaming device, the second gaming device having at least a second projector operable to project images from the second gaming device onto a surface adjacent to the second gaming device; and one or more external controllers in network communication with the first and second gaming devices, the one or more external controllers including an external video controller, wherein the external video controller is a multi-port video controller operable to communicate with both the first gaming device and the second gaming device, wherein the one or more external controllers execute instructions to perform operations comprising:

using the external video controller operable to communicate with both the first gaming device and the second gaming device:

remotely controlling the first projector on the first gaming device to project a first image from the first gaming device, wherein data for displaying the first image is stored in a memory accessible by the external video controller; and remotely controlling the second projector on the second gaming device to project a second image from the second gaming device, wherein the data for displaying the second image is stored in the memory accessible by the external video controller.

9. The gaming system of claim 8, further comprising a sensor configured to identify a trigger condition for controlling the first and second projectors.

10. The gaming system of claim 8, wherein the first gaming device is configured to identify a first trigger condition in a game outcome presented on the first gaming device;

wherein the first gaming device further comprises a first onboard video controller; and wherein in response to the first trigger condition, the first onboard video controller in the first gaming device is configured to control the first projector on the first gaming device to project a third image instead of the first image, wherein the data for displaying the third image is stored in onboard memory within the first gaming device and accessible to the first onboard video controller.

11. The gaming system of claim 10, wherein the second gaming device is configured to identify a second trigger condition in the game outcome presented on the second gaming device;

wherein the second gaming device further comprises a second onboard video controller; and wherein, in response to the second trigger condition having been identified, the second onboard video controller in the second gaming device controls the second projector on the second gaming device to project a fourth image instead of the second image, wherein the data for displaying the fourth image is stored in a memory onboard the second gaming device and accessible to the second onboard video controller.

12. The gaming system of claim 11, wherein the first trigger condition equals to the second trigger condition.

13. The gaming system of claim 8, wherein the first gaming device is located adjacent to the second gaming device, and the first image and the second image are arranged to form a composite video image.

14. The gaming system of claim 13, wherein the first image is projected at a first display area, and wherein the second image is displayed at a second display area and wherein the first display area is contiguous with the second display areas.

15. The gaming system of claim 13, wherein the first image and the second image are each of video images presented under control of the external video controller, and wherein the external video controller synchronizes the first and second images to provide the composite video image.

16. The gaming system of claim 14, wherein the composite video image includes text scrolling sequentially across the first and second display areas.

17. The gaming system of claim 14, wherein the composite video image comprises an animation of graphic elements moving sequentially across the first and second display areas.

* * * * *